US009958275B2

(12) United States Patent
Chelian et al.

(10) Patent No.: US 9,958,275 B2
(45) Date of Patent: May 1, 2018

(54) SYSTEM AND METHOD FOR WEARABLE SMART DEVICE COMMUNICATIONS

(71) Applicant: Toyota Motor Engineering & Manufacturing North America, Inc., Erlanger, KY (US)

(72) Inventors: Suhas E. Chelian, San Jose, CA (US); Christopher P. Lee, Campbell, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 25 days.

(21) Appl. No.: 15/169,476

(22) Filed: May 31, 2016

(65) Prior Publication Data
US 2017/0343354 A1 Nov. 30, 2017

(51) Int. Cl.
*G01C 21/16* (2006.01)
*H04B 1/3827* (2015.01)
(Continued)

(52) U.S. Cl.
CPC .......... *G01C 21/165* (2013.01); *H04B 1/385* (2013.01); *H04W 4/008* (2013.01); *H04W 4/02* (2013.01); *H04W 52/028* (2013.01)

(58) Field of Classification Search
CPC ..... G01C 21/165; H04B 1/385; H04W 4/008; H04W 4/02; H04W 52/028
See application file for complete search history.

(56) References Cited

U.S. PATENT DOCUMENTS

| 4,520,501 A | 5/1985 | DuBrucq |
| 4,586,827 A | 5/1986 | Hirsch et al. |

(Continued)

FOREIGN PATENT DOCUMENTS

| CN | 201260746 | 6/2009 |
| CN | 101527093 | 9/2009 |

(Continued)

OTHER PUBLICATIONS

AlZuhair et al.; "NFC Based Applications for Visually Impaired People—A Review"; IEEE International Conference on Multimedia and Expo Workshops (ICMEW), Jul. 14, 2014; 7 pages.
(Continued)

*Primary Examiner* — Calvin Cheung
(74) *Attorney, Agent, or Firm* — Snell & Wilmer

(57) ABSTRACT

A wearable smart device includes an outer casing wearable by a user and defining at least one cavity and having a neck portion, a first end portion designed to rest on a first shoulder of the user, and a second end portion designed to rest on a second shoulder of the user. The wearable smart device also includes a wireless communication port at least partially positioned within the cavity and designed to communicate with a remote device. The wireless communication port includes a dedicated short range communication (DSRC) port, a near field communication (NFC) port, an infrared communication port and/or an ultrasound communication port. A processor is positioned within the cavity, coupled to the wireless communication port and designed to transmit one or more signals to the remote device and/or receive one or more signals from the remote device via the wireless communication port.

18 Claims, 6 Drawing Sheets

(51) Int. Cl.
*H04W 4/00* (2018.01)
*H04W 4/02* (2018.01)
*H04W 52/02* (2009.01)

(56) References Cited

U.S. PATENT DOCUMENTS

| | | |
|---|---|---|
| 4,786,966 A | 11/1988 | Hanson |
| 5,047,952 A | 9/1991 | Kramer |
| 5,097,856 A | 3/1992 | Chi-Sheng |
| 5,129,716 A | 7/1992 | Holakovszky et al. |
| 5,233,520 A | 8/1993 | Kretsch et al. |
| 5,265,272 A | 11/1993 | Kurcbart |
| 5,463,428 A | 10/1995 | Lipton et al. |
| 5,508,699 A | 4/1996 | Silverman |
| 5,539,665 A | 7/1996 | Lamming et al. |
| 5,543,802 A | 8/1996 | Villevieille et al. |
| 5,544,050 A | 8/1996 | Abe |
| 5,568,127 A | 10/1996 | Bang |
| 5,636,038 A | 6/1997 | Lynt |
| 5,659,764 A | 8/1997 | Sakiyama |
| 5,701,356 A | 12/1997 | Stanford et al. |
| 5,733,127 A | 3/1998 | Mecum |
| 5,807,111 A | 9/1998 | Schrader |
| 5,872,744 A | 2/1999 | Taylor |
| 5,884,198 A * | 3/1999 | Kese ............... H04B 1/385 |
| | | 343/702 |
| 5,953,693 A | 9/1999 | Sakiyama |
| 5,956,630 A | 9/1999 | Mackey |
| 5,982,286 A | 11/1999 | Vanmoor |
| 6,009,577 A | 1/2000 | Day |
| 6,055,048 A | 4/2000 | Langevin et al. |
| 6,067,112 A | 5/2000 | Wellner et al. |
| 6,199,010 B1 | 3/2001 | Richton |
| 6,229,901 B1 | 5/2001 | Mickelson et al. |
| 6,230,135 B1 | 5/2001 | Ramsay |
| 6,230,349 B1 | 5/2001 | Silver et al. |
| 6,285,757 B1 | 9/2001 | Carroll et al. |
| 6,307,526 B1 | 10/2001 | Mann |
| 6,323,807 B1 | 11/2001 | Golding et al. |
| 6,349,001 B1 | 2/2002 | Spitzer |
| 6,466,232 B1 | 10/2002 | Newell et al. |
| 6,477,239 B1 | 11/2002 | Ohki |
| 6,542,623 B1 | 4/2003 | Kahn |
| 6,580,999 B2 | 6/2003 | Maruyama et al. |
| 6,594,370 B1 * | 7/2003 | Anderson ............ H01Q 1/273 |
| | | 381/315 |
| 6,603,863 B1 | 8/2003 | Nagayoshi |
| 6,619,836 B1 | 9/2003 | Silvant et al. |
| 6,701,296 B1 | 3/2004 | Kramer |
| 6,771,224 B2 * | 8/2004 | Apostolos ............ G01S 5/04 |
| | | 343/718 |
| 6,774,788 B1 | 8/2004 | Balfe |
| 6,825,875 B1 | 11/2004 | Strub et al. |
| 6,826,477 B2 | 11/2004 | Ladetto et al. |
| 6,834,373 B2 | 12/2004 | Dieberger |
| 6,839,667 B2 | 1/2005 | Reich |
| 6,857,775 B1 | 2/2005 | Wilson |
| 6,920,229 B2 | 7/2005 | Boesen |
| D513,997 S | 1/2006 | Wilson |
| 6,995,723 B1 * | 2/2006 | Adams ............... H01Q 1/12 |
| | | 343/718 |
| 7,027,874 B1 | 4/2006 | Sawan et al. |
| D522,300 S | 6/2006 | Roberts |
| 7,069,215 B1 | 6/2006 | Bangalore |
| 7,106,220 B2 | 9/2006 | Gourgey et al. |
| 7,228,275 B1 | 6/2007 | Endo |
| 7,299,034 B2 | 11/2007 | Kates |
| 7,308,314 B2 | 12/2007 | Havey et al. |
| 7,336,226 B2 | 2/2008 | Jung et al. |
| 7,356,473 B2 | 4/2008 | Kates |
| 7,413,554 B2 | 8/2008 | Kobayashi et al. |
| 7,417,592 B1 | 8/2008 | Hsiao et al. |
| 7,428,429 B2 | 9/2008 | Gantz et al. |
| 7,463,188 B1 | 12/2008 | McBurney |
| 7,496,445 B2 | 2/2009 | Mohsini et al. |
| 7,501,958 B2 | 3/2009 | Saltzstein et al. |
| 7,525,568 B2 | 4/2009 | Raghunath |
| 7,564,469 B2 | 7/2009 | Cohen |
| 7,565,295 B1 | 7/2009 | Hernandez-Rebollar |
| 7,598,976 B2 | 10/2009 | Sofer et al. |
| 7,618,260 B2 | 11/2009 | Daniel et al. |
| D609,818 S | 2/2010 | Tsang et al. |
| 7,656,290 B2 | 2/2010 | Fein et al. |
| 7,659,915 B2 | 2/2010 | Kurzweil et al. |
| 7,715,873 B1 * | 5/2010 | Biere ................... H04M 19/04 |
| | | 455/418 |
| 7,743,996 B2 | 6/2010 | Maciver |
| 7,769,412 B1 * | 8/2010 | Gailloux ............... H04M 1/05 |
| | | 455/419 |
| D625,427 S | 10/2010 | Lee |
| 7,843,351 B2 | 11/2010 | Bourne |
| 7,843,488 B2 | 11/2010 | Stapleton |
| 7,848,512 B2 | 12/2010 | Eldracher |
| 7,864,991 B2 | 1/2011 | Espenlaub et al. |
| 7,938,756 B2 | 5/2011 | Rodetsky et al. |
| 7,991,576 B2 | 8/2011 | Roumeliotis |
| 8,005,263 B2 | 8/2011 | Fujimura |
| 8,035,519 B2 | 10/2011 | Davis |
| D649,655 S | 11/2011 | Petersen |
| 8,123,660 B2 | 2/2012 | Kruse et al. |
| D656,480 S | 3/2012 | McManigal et al. |
| 8,138,907 B2 | 3/2012 | Barbeau et al. |
| 8,150,107 B2 | 4/2012 | Kurzweil et al. |
| 8,177,705 B2 | 5/2012 | Abolfathi |
| 8,239,032 B2 | 8/2012 | Dewhurst |
| 8,253,760 B2 | 8/2012 | Sako et al. |
| 8,300,862 B2 | 10/2012 | Newton et al. |
| 8,325,263 B2 | 12/2012 | Kato et al. |
| D674,501 S | 1/2013 | Petersen |
| 8,359,122 B2 | 1/2013 | Koselka et al. |
| 8,391,719 B2 * | 3/2013 | Alameh ............... H04M 1/7253 |
| | | 398/115 |
| 8,395,968 B2 | 3/2013 | Vartanian et al. |
| 8,401,785 B2 | 3/2013 | Cho et al. |
| 8,414,246 B2 | 4/2013 | Tobey |
| 8,418,705 B2 | 4/2013 | Ota et al. |
| 8,428,643 B2 | 4/2013 | Lin |
| 8,430,310 B1 * | 4/2013 | Ho ..................... G06F 21/35 |
| | | 235/382 |
| 8,483,956 B2 | 7/2013 | Zhang |
| 8,494,507 B1 | 7/2013 | Tedesco et al. |
| 8,494,859 B2 | 7/2013 | Said |
| 8,538,687 B2 | 9/2013 | Plocher et al. |
| 8,538,688 B2 | 9/2013 | Prehofer |
| 8,571,860 B2 | 10/2013 | Strope |
| 8,583,282 B2 | 11/2013 | Angle et al. |
| 8,588,464 B2 | 11/2013 | Albertson et al. |
| 8,588,972 B2 | 11/2013 | Fung |
| 8,591,412 B2 | 11/2013 | Kovarik et al. |
| 8,594,935 B2 | 11/2013 | Cioffi et al. |
| 8,606,316 B2 | 12/2013 | Evanitsky |
| 8,610,879 B2 | 12/2013 | Ben-Moshe et al. |
| 8,630,633 B1 | 1/2014 | Tedesco et al. |
| 8,676,274 B2 | 3/2014 | Li |
| 8,676,623 B2 | 3/2014 | Gale et al. |
| 8,694,251 B2 | 4/2014 | Janardhanan et al. |
| 8,704,902 B2 | 4/2014 | Naick et al. |
| 8,718,672 B2 | 5/2014 | Xie et al. |
| 8,743,145 B1 | 6/2014 | Price |
| 8,750,898 B2 | 6/2014 | Haney |
| 8,768,071 B2 | 7/2014 | Tsuchinaga et al. |
| 8,786,680 B2 | 7/2014 | Shiratori et al. |
| 8,797,141 B2 | 8/2014 | Best et al. |
| 8,797,386 B2 | 8/2014 | Chou et al. |
| 8,803,699 B2 | 8/2014 | Foshee et al. |
| 8,805,929 B2 | 8/2014 | Erol et al. |
| 8,812,244 B2 | 8/2014 | Angelides |
| 8,814,019 B2 | 8/2014 | Dyster et al. |
| 8,825,398 B2 | 9/2014 | Alexandre et al. |
| 8,836,532 B2 | 9/2014 | Fish, Jr. et al. |
| 8,836,580 B2 | 9/2014 | Mendelson |
| 8,836,910 B2 | 9/2014 | Cashin et al. |
| 8,902,303 B2 | 12/2014 | Na'Aman et al. |
| 8,909,534 B1 | 12/2014 | Heath |

(56) References Cited

U.S. PATENT DOCUMENTS

| | | | |
|---|---|---|---|
| D721,673 S | 1/2015 | Park et al. |
| 8,926,330 B2 | 1/2015 | Taghavi |
| 8,930,458 B2 | 1/2015 | Lewis et al. |
| 8,981,682 B2 | 3/2015 | Delson et al. |
| 8,994,498 B2 | 3/2015 | Agrafioti |
| D727,194 S | 4/2015 | Wilson |
| 9,004,330 B2 | 4/2015 | White |
| 9,025,016 B2 | 5/2015 | Wexler et al. |
| 9,042,596 B2 | 5/2015 | Connor |
| 9,053,094 B2 | 6/2015 | Yassa |
| 9,076,450 B1 | 7/2015 | Sadek |
| 9,081,079 B2 | 7/2015 | Chao et al. |
| 9,081,385 B1 | 7/2015 | Ferguson et al. |
| D736,741 S | 8/2015 | Katz |
| 9,111,545 B2 | 8/2015 | Jadhav et al. |
| D738,238 S | 9/2015 | Pede et al. |
| 9,137,484 B2 | 9/2015 | DiFrancesco et al. |
| 9,137,639 B2 | 9/2015 | Garin et al. |
| 9,140,554 B2 | 9/2015 | Jerauld |
| 9,148,191 B2 | 9/2015 | Teng et al. |
| 9,158,378 B2 | 10/2015 | Hirukawa |
| D742,535 S | 11/2015 | Wu |
| D743,933 S | 11/2015 | Park et al. |
| 9,185,489 B2 | 11/2015 | Gerber et al. |
| 9,190,058 B2 | 11/2015 | Klein |
| 9,104,806 B2 | 12/2015 | Stivoric et al. |
| 9,226,097 B2 * | 12/2015 | Holman | H04W 4/008 |
| 9,230,430 B2 | 1/2016 | Civelli et al. |
| 9,232,366 B1 * | 1/2016 | Charlier | H04W 4/10 |
| 9,267,801 B2 | 2/2016 | Gupta et al. |
| 9,269,015 B2 | 2/2016 | Boncyk et al. |
| 9,275,376 B2 | 3/2016 | Barraclough et al. |
| 9,304,588 B2 | 4/2016 | Aldossary |
| D756,958 S | 5/2016 | Lee et al. |
| D756,959 S | 5/2016 | Lee et al. |
| 9,335,175 B2 | 5/2016 | Zhang et al. |
| 9,341,014 B2 | 5/2016 | Oshima et al. |
| 9,355,547 B2 | 5/2016 | Stevens et al. |
| 9,820,120 B2 * | 11/2017 | deCharms | H04W 4/22 |
| 2001/0023387 A1 | 9/2001 | Rollo |
| 2002/0067282 A1 | 6/2002 | Moskowitz et al. |
| 2002/0071277 A1 | 6/2002 | Starner et al. |
| 2002/0075323 A1 | 6/2002 | O'Dell |
| 2002/0142734 A1 * | 10/2002 | Wickstead | H04B 1/385 |
| | | | 455/553.1 |
| 2002/0173346 A1 | 11/2002 | Wang |
| 2002/0178344 A1 | 11/2002 | Bourguet |
| 2003/0026461 A1 | 2/2003 | Hunter |
| 2003/0133008 A1 | 7/2003 | Stephenson |
| 2003/0133085 A1 | 7/2003 | Tretiakoff |
| 2003/0179133 A1 | 9/2003 | Pepin et al. |
| 2004/0056907 A1 | 3/2004 | Sharma |
| 2004/0232179 A1 | 11/2004 | Chauhan |
| 2004/0267442 A1 | 12/2004 | Fehr et al. |
| 2005/0020845 A1 | 9/2005 | Fink et al. |
| 2005/0221260 A1 | 10/2005 | Kikuchi |
| 2005/0259035 A1 | 11/2005 | Iwaki |
| 2005/0283752 A1 | 12/2005 | Fruchter |
| 2006/0004512 A1 | 1/2006 | Herbst et al. |
| 2006/0028550 A1 | 2/2006 | Palmer, Jr. et al. |
| 2006/0029256 A1 | 2/2006 | Miyoshi et al. |
| 2006/0129308 A1 | 6/2006 | Kates |
| 2006/0171704 A1 | 8/2006 | Bingle et al. |
| 2006/0177086 A1 * | 8/2006 | Rye | H04R 1/345 |
| | | | 381/370 |
| 2006/0184318 A1 | 8/2006 | Yoshimine |
| 2006/0292533 A1 | 12/2006 | Selod |
| 2007/0001904 A1 | 1/2007 | Mendelson |
| 2007/0052672 A1 | 3/2007 | Ritter et al. |
| 2007/0173688 A1 | 7/2007 | Kim |
| 2007/0182812 A1 | 8/2007 | Ritchey |
| 2007/0202865 A1 | 8/2007 | Moride |
| 2007/0230786 A1 | 10/2007 | Foss |
| 2007/0296572 A1 | 12/2007 | Fein et al. |
| 2008/0024594 A1 | 1/2008 | Ritchey |
| 2008/0068559 A1 | 3/2008 | Howell et al. |
| 2008/0120029 A1 | 5/2008 | Zelek et al. |
| 2008/0144854 A1 | 6/2008 | Abreu |
| 2008/0145822 A1 | 6/2008 | Bucchieri |
| 2008/0174676 A1 | 7/2008 | Squilla et al. |
| 2008/0198222 A1 | 8/2008 | Gowda |
| 2008/0198324 A1 | 8/2008 | Fuziak |
| 2008/0208455 A1 | 8/2008 | Hartman |
| 2008/0251110 A1 | 10/2008 | Pede |
| 2008/0260210 A1 | 10/2008 | Kobeli |
| 2009/0012788 A1 | 1/2009 | Gilbert |
| 2009/0040215 A1 | 2/2009 | Afzulpurkar |
| 2009/0058611 A1 | 3/2009 | Kawamura |
| 2009/0069045 A1 * | 3/2009 | Cheng | H02J 7/0042 |
| | | | 455/556.1 |
| 2009/0106016 A1 | 4/2009 | Athsani |
| 2009/0118652 A1 | 5/2009 | Carlucci |
| 2009/0122161 A1 | 5/2009 | Bolkhovitinov |
| 2009/0122648 A1 | 5/2009 | Mountain et al. |
| 2009/0157302 A1 | 6/2009 | Tashev et al. |
| 2009/0177437 A1 | 7/2009 | Roumeliotis |
| 2009/0189974 A1 | 7/2009 | Deering |
| 2009/0210596 A1 | 8/2009 | Furuya |
| 2010/0041378 A1 | 2/2010 | Aceves et al. |
| 2010/0080418 A1 | 4/2010 | Ito |
| 2010/0109918 A1 | 5/2010 | Liebermann |
| 2010/0110368 A1 | 5/2010 | Chaum |
| 2010/0179452 A1 | 7/2010 | Srinivasan |
| 2010/0182242 A1 | 7/2010 | Fields et al. |
| 2010/0182450 A1 | 7/2010 | Kumar et al. |
| 2010/0198494 A1 | 8/2010 | Chao et al. |
| 2010/0199232 A1 | 8/2010 | Mistry et al. |
| 2010/0241350 A1 | 9/2010 | Cioffi et al. |
| 2010/0245585 A1 | 9/2010 | Fisher et al. |
| 2010/0267276 A1 | 10/2010 | Wu et al. |
| 2010/0292917 A1 | 11/2010 | Emam et al. |
| 2010/0298976 A1 | 11/2010 | Sugihara et al. |
| 2010/0305845 A1 | 12/2010 | Alexandre et al. |
| 2010/0308999 A1 | 12/2010 | Chornenky |
| 2011/0066383 A1 | 3/2011 | Jangle et al. |
| 2011/0071830 A1 | 3/2011 | Kim |
| 2011/0092249 A1 | 4/2011 | Evanitsky |
| 2011/0124383 A1 | 5/2011 | Garra et al. |
| 2011/0125735 A1 | 5/2011 | Petrou |
| 2011/0181422 A1 | 7/2011 | Tran |
| 2011/0187640 A1 | 8/2011 | Jacobsen et al. |
| 2011/0211760 A1 | 9/2011 | Boncyk et al. |
| 2011/0216006 A1 | 9/2011 | Litschel |
| 2011/0221670 A1 | 9/2011 | King, III et al. |
| 2011/0234584 A1 | 9/2011 | Endo |
| 2011/0246064 A1 | 10/2011 | Nicholson |
| 2011/0260681 A1 | 10/2011 | Guccione et al. |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1 | 3/2012 | Osterhout et al. |
| 2012/0082962 A1 | 4/2012 | Schmidt |
| 2012/0085377 A1 | 4/2012 | Trout |
| 2012/0092161 A1 | 4/2012 | West |
| 2012/0092460 A1 | 4/2012 | Mahoney |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1 | 6/2012 | Xiao et al. |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1 | 8/2012 | Murphy |
| 2012/0214418 A1 | 8/2012 | Lee et al. |
| 2012/0220234 A1 * | 8/2012 | Abreu | G02C 3/003 |
| | | | 455/41.2 |
| 2012/0232430 A1 | 9/2012 | Boissy et al. |
| 2012/0249797 A1 | 10/2012 | Haddick et al. |
| 2012/0250615 A1 * | 10/2012 | Gupta | H04W 76/002 |
| | | | 370/328 |
| 2012/0252483 A1 | 10/2012 | Farmer et al. |
| 2012/0316884 A1 | 12/2012 | Rozaieski et al. |

(56) References Cited

U.S. PATENT DOCUMENTS

| | | |
|---|---|---|
| 2012/0323485 A1 | 12/2012 | Mutoh |
| 2012/0327194 A1 | 12/2012 | Shiratori |
| 2013/0002452 A1 | 1/2013 | Lauren |
| 2013/0044005 A1 | 2/2013 | Foshee et al. |
| 2013/0046541 A1 | 2/2013 | Klein et al. |
| 2013/0066636 A1 | 3/2013 | Singhal |
| 2013/0079061 A1 | 3/2013 | Jadhav |
| 2013/0090133 A1 | 4/2013 | D'Jesus Bencci |
| 2013/0115578 A1 | 5/2013 | Shiina |
| 2013/0115579 A1 | 5/2013 | Taghavi |
| 2013/0116559 A1 | 5/2013 | Levin et al. |
| 2013/0127980 A1 | 5/2013 | Haddick |
| 2013/0128051 A1 | 5/2013 | Velipasalar et al. |
| 2013/0131985 A1 | 5/2013 | Weiland et al. |
| 2013/0141576 A1 | 6/2013 | Lord et al. |
| 2013/0144629 A1 | 6/2013 | Johnston |
| 2013/0155474 A1 | 6/2013 | Roach et al. |
| 2013/0157230 A1 | 6/2013 | Morgan |
| 2013/0184982 A1 | 7/2013 | DeLuca et al. |
| 2013/0201344 A1 | 8/2013 | Sweet, III |
| 2013/0204605 A1 | 8/2013 | Illgner-Fehns |
| 2013/0211718 A1 | 8/2013 | Yoo et al. |
| 2013/0218456 A1 | 8/2013 | Zelek et al. |
| 2013/0202274 A1 | 9/2013 | Chan |
| 2013/0228615 A1 | 9/2013 | Gates et al. |
| 2013/0229669 A1 | 9/2013 | Smits |
| 2013/0243250 A1 | 9/2013 | France |
| 2013/0245396 A1 | 9/2013 | Berman et al. |
| 2013/0250078 A1 | 9/2013 | Levy |
| 2013/0250233 A1 | 9/2013 | Blum et al. |
| 2013/0253818 A1 | 9/2013 | Sanders et al. |
| 2013/0265450 A1 | 10/2013 | Barnes, Jr. |
| 2013/0271584 A1 | 10/2013 | Wexler et al. |
| 2013/0290909 A1 | 10/2013 | Gray |
| 2013/0307842 A1 | 11/2013 | Grinberg et al. |
| 2013/0311179 A1 | 11/2013 | Wagner |
| 2013/0328683 A1 | 12/2013 | Sitbon et al. |
| 2013/0332452 A1 | 12/2013 | Jarvis |
| 2014/0009561 A1 | 1/2014 | Sutherland et al. |
| 2014/0031081 A1 | 1/2014 | Vossoughi et al. |
| 2014/0031977 A1 | 1/2014 | Goldenberg et al. |
| 2014/0032596 A1 | 1/2014 | Fish et al. |
| 2014/0037149 A1 | 2/2014 | Zetune |
| 2014/0055353 A1 | 2/2014 | Takahama |
| 2014/0071234 A1 | 3/2014 | Millett |
| 2014/0081631 A1* | 3/2014 | Zhu ............... G10L 21/0208 704/226 |
| 2014/0085446 A1 | 3/2014 | Hicks |
| 2014/0098018 A1 | 4/2014 | Kim et al. |
| 2014/0100773 A1 | 4/2014 | Cunningham et al. |
| 2014/0125700 A1 | 5/2014 | Ramachandran et al. |
| 2014/0132388 A1 | 5/2014 | Alalawi |
| 2014/0133290 A1 | 5/2014 | Yokoo |
| 2014/0160250 A1 | 6/2014 | Pomerantz |
| 2014/0184384 A1 | 7/2014 | Zhu et al. |
| 2014/0184775 A1 | 7/2014 | Drake |
| 2014/0204245 A1 | 7/2014 | Wexler |
| 2014/0222023 A1 | 8/2014 | Kim et al. |
| 2014/0233859 A1 | 8/2014 | Cho |
| 2014/0236932 A1 | 8/2014 | Ikonomov |
| 2014/0249847 A1 | 9/2014 | Soon-Shiong |
| 2014/0251396 A1 | 9/2014 | Subhashrao et al. |
| 2014/0253702 A1 | 9/2014 | Wexler et al. |
| 2014/0278070 A1 | 9/2014 | McGavran et al. |
| 2014/0281943 A1 | 9/2014 | Prilepov |
| 2014/0287382 A1 | 9/2014 | Villar Cloquell |
| 2014/0309806 A1 | 10/2014 | Ricci |
| 2014/0313040 A1 | 10/2014 | Wright, Sr. |
| 2014/0335893 A1 | 11/2014 | Ronen |
| 2014/0343846 A1 | 11/2014 | Goldman et al. |
| 2014/0345956 A1 | 11/2014 | Kojina |
| 2014/0347265 A1 | 11/2014 | Aimone |
| 2014/0368412 A1 | 12/2014 | Jacobsen et al. |
| 2014/0369541 A1 | 12/2014 | Miskin et al. |
| 2014/0379251 A1 | 12/2014 | Tolstedt |
| 2014/0379336 A1 | 12/2014 | Bhatnager |
| 2015/0002808 A1 | 1/2015 | Rizzo, III et al. |
| 2015/0016035 A1 | 1/2015 | Tussy |
| 2015/0058237 A1 | 2/2015 | Bailey |
| 2015/0063661 A1 | 3/2015 | Lee |
| 2015/0081884 A1 | 3/2015 | Maguire |
| 2015/0099946 A1 | 4/2015 | Sahin |
| 2015/0109107 A1 | 4/2015 | Gomez et al. |
| 2015/0120186 A1 | 4/2015 | Heikes |
| 2015/0135310 A1 | 5/2015 | Lee |
| 2015/0141085 A1 | 5/2015 | Nuovo et al. |
| 2015/0142891 A1 | 5/2015 | Haque et al. |
| 2015/0154643 A1 | 6/2015 | Artman et al. |
| 2015/0125831 A1 | 7/2015 | Chandrashekhar Nair et al. |
| 2015/0196101 A1 | 7/2015 | Dayal et al. |
| 2015/0198454 A1 | 7/2015 | Moore et al. |
| 2015/0198455 A1 | 7/2015 | Chen et al. |
| 2015/0199566 A1 | 7/2015 | Moore et al. |
| 2015/0201181 A1 | 7/2015 | Moore et al. |
| 2015/0211858 A1 | 7/2015 | Jerauld |
| 2015/0219757 A1 | 8/2015 | Boelter et al. |
| 2015/0223355 A1 | 8/2015 | Fleck |
| 2015/0256977 A1 | 9/2015 | Huang |
| 2015/0257555 A1 | 9/2015 | Wong |
| 2015/0260474 A1 | 9/2015 | Rublowsky et al. |
| 2015/0262509 A1 | 9/2015 | Labbe |
| 2015/0279172 A1 | 10/2015 | Hyde |
| 2015/0324646 A1 | 11/2015 | Kimia |
| 2015/0330787 A1 | 11/2015 | Cioffi et al. |
| 2015/0336276 A1 | 11/2015 | Song et al. |
| 2015/0338917 A1 | 11/2015 | Steiner et al. |
| 2015/0341591 A1 | 11/2015 | Kelder et al. |
| 2015/0346496 A1 | 12/2015 | Haddick et al. |
| 2015/0356345 A1 | 12/2015 | Velozo |
| 2015/0356837 A1 | 12/2015 | Pajestka et al. |
| 2015/0364943 A1 | 12/2015 | Vick et al. |
| 2015/0367176 A1 | 12/2015 | Bejestan |
| 2015/0375395 A1 | 12/2015 | Kwon et al. |
| 2016/0007158 A1 | 1/2016 | Venkatraman |
| 2016/0028917 A1 | 1/2016 | Wexler |
| 2016/0042228 A1 | 2/2016 | Opalka |
| 2016/0078289 A1 | 3/2016 | Michel |
| 2016/0098138 A1 | 4/2016 | Park |
| 2016/0156850 A1 | 6/2016 | Werblin et al. |
| 2016/0173982 A1* | 6/2016 | Anderson ............... H04R 3/00 381/119 |
| 2016/0198319 A1 | 7/2016 | Huang |
| 2016/0350514 A1 | 12/2016 | Rajendran |

FOREIGN PATENT DOCUMENTS

| | | |
|---|---|---|
| CN | 201440733 | 4/2010 |
| CN | 101803988 | 8/2010 |
| CN | 101647745 | 1/2011 |
| CN | 102316193 | 1/2012 |
| CN | 102631280 | 8/2012 |
| CN | 202547659 | 11/2012 |
| CN | 202722736 | 2/2013 |
| CN | 102323819 | 6/2013 |
| CN | 103445920 | 12/2013 |
| DE | 102011080056 | 1/2013 |
| DE | 102012000587 | 7/2013 |
| DE | 102012202614 | 8/2013 |
| EP | 1174049 | 9/2004 |
| EP | 1721237 | 11/2006 |
| EP | 2368455 | 9/2011 |
| EP | 2371339 | 10/2011 |
| EP | 2127033 | 8/2012 |
| EP | 2581856 | 4/2013 |
| EP | 2751775 | 7/2016 |
| FR | 2885251 | 11/2006 |
| GB | 2401752 | 11/2004 |
| JP | 1069539 | 3/1998 |
| JP | 2001304908 | 10/2001 |
| JP | 2010012529 | 1/2010 |
| JP | 2010182193 | 8/2010 |
| JP | 4727352 | 7/2011 |
| JP | 2013169611 | 9/2013 |
| KR | 100405636 | 11/2003 |

(56) References Cited

FOREIGN PATENT DOCUMENTS

| | | |
|---|---|---|
| KR | 20080080688 | 9/2008 |
| KR | 20120020212 | 3/2012 |
| KR | 1250929 | 4/2013 |
| WO | WO 1995004440 | 2/1995 |
| WO | WO 9949656 | 9/1999 |
| WO | WO 0010073 | 2/2000 |
| WO | WO 0038393 | 6/2000 |
| WO | WO 179956 | 10/2001 |
| WO | WO 2004/076974 | 9/2004 |
| WO | WO 2006/028354 | 3/2006 |
| WO | WO 2006/045819 | 5/2006 |
| WO | WO 2007/031782 | 3/2007 |
| WO | WO 2008015375 | 2/2008 |
| WO | WO 2008/035993 | 3/2008 |
| WO | WO 2008/008791 | 4/2008 |
| WO | WO 2008/096134 | 8/2008 |
| WO | WO 2008127316 | 10/2008 |
| WO | WO 2010/062481 | 6/2010 |
| WO | WO 2010/109313 | 9/2010 |
| WO | WO 2012/040703 | 3/2012 |
| WO | WO 2012163675 | 12/2012 |
| WO | WO 2013/045557 | 4/2013 |
| WO | WO 2013/054257 | 4/2013 |
| WO | WO 2013/067539 | 5/2013 |
| WO | WO 2013/147704 | 10/2013 |
| WO | WO 2014104531 | 7/2014 |
| WO | WO 2014/138123 | 9/2014 |
| WO | WO 2014/172378 | 10/2014 |
| WO | WO 2015065418 | 5/2015 |
| WO | WO 2015092533 | 6/2015 |
| WO | WO 2015108882 | 7/2015 |
| WO | WO 2015127062 | 8/2015 |

OTHER PUBLICATIONS

"Light Detector" *EveryWare Technologies*; 2 pages; Jun. 18, 2016.
Aggarwal et al.; "All-in-One Companion for Visually Impaired;" *International Journal of Computer Applications*; vol. 79, No. 14; pp. 37-40; Oct. 2013.
AppleVis; *An Introduction to Braille Screen Input on iOS 8*; http://www.applevis.com/guides/braille-ios/introduction-braille-screen-input-ios-8, Nov. 16, 2014; 7 pages.
Arati et al. "Object Recognition in Mobile Phone Application for Visually Impaired Users;" *IOSR Journal of Computer Engineering (IOSR-JCE)*; vol. 17, No. 1; pp. 30-33; Jan. 2015.
Bharathi et al.; "Effective Navigation for Visually Impaired by Wearable Obstacle Avoidance System;" *2012 International Conference on Computing, Electronics and Electrical Technologies (ICCEET)*; pp. 956-958; 2012.
Bhatlawande et al.; "Way-finding Electronic Bracelet for Visually Impaired People"; IEEE Point-of-Care Healthcare Technologies (PHT), Jan. 16-18, 2013; 4 pages.
Bigham et al.; "*VizWiz: Nearly Real-Time Answers to Visual Questions*" Proceedings of the 23nd annual ACM symposium on User interface software and technology; 2010; 2 pages.
Blaze Engineering; "*Visually Impaired Resource Guide: Assistive Technology for Students who use Braille*"; Braille 'n Speak Manual; http://www.blaize.com; Nov. 17, 2014; 5 pages.
Blenkhorn et al.; "*An Ultrasonic Mobility Device with Minimal Audio Feedback*"; Center on Disabilities Technology and Persons with Disabilities Conference; Nov. 22, 1997; 5 pages.
Borenstein et al.; "*The GuideCane—A Computerized Travel Aid for the Active Guidance of Blind Pedestrians*"; IEEE International Conference on Robotics and Automation; Apr. 21-27, 1997; 6 pages.
Bujacz et al.; "*Remote Guidance for the Blind—A Proposed Teleassistance System and Navigation Trials*"; Conference on Human System Interactions; May 25-27, 2008; 6 pages.
Burbey et al.; "*Human Information Processing with the Personal Memex*"; ISE 5604 Fall 2005; Dec. 6, 2005; 88 pages.
Campos et al.; "*Design and Evaluation of a Spoken-Feedback Keyboard*"; Department of Information Systems and Computer Science, INESC-ID/IST/Universidade Tecnica de Lisboa, Jul. 2004, 6 pages.

Caperna et al.; "*A Navigation and Object Location Device for the Blind*"; Tech. rep. University of Maryland College Park; May 2009; 129 pages.
Cardonha et al.; "*A Crowdsourcing Platform for the Construction of Accessibility Maps*"; W4A'13 Proceedings of the 10$^{th}$ International Cross-Disciplinary Conference on Web Accessibility; Article No. 26; 2013; 5 pages.
Chaudary et al.; "*Alternative Navigation Assistance Aids for Visually Impaired Blind Persons*"; Proceedings of ICEAPVI; Feb. 12-14, 2015; 5 pages.
Coughlan et al.; "*Crosswatch: A System for Providing Guidance to Visually Impaired Travelers at Traffic Intersections*"; Journal of Assistive Technologies 7.2; 2013; 17 pages.
D'Andrea, Frances Mary; "*More than a Perkins Brailler: A Review of the Mountbatten Brailler, Part 1*"; AFB AccessWorld Magazine; vol. 6, No. 1, Jan. 2005; 9 pages.
Dias et al.; "*Enhancing an Automated Braille Writing Tutor*"; IEEE/RSJ International Conference on Intelligent Robots and Systems; Oct. 11-15, 2009; 7 pages.
Dowling et al.; "*Intelligent Image Processing Constraints for Blind Mobility Facilitated Through Artificial Vision*"; 8$^{th}$ Australian and NewZealand Intelligent Information Systems Conference (ANZIIS); Dec. 10-12, 2003; 7 pages.
Ebay; Matin (Made in Korea) Neoprene Canon DSLR Camera Curved Neck Strap #6782; http://www.ebay.com/itm/MATIN-Made-in-Korea-Neoprene-Canon-DSLR-Camera-Curved-Neck-Strap-6782-/281608526018?hash=item41912d18c2:g:~pMAAOSwe-FU6zDa ; 4 pages.
Eccles, Lisa; "*Smart Walker Detects Obstacles*"; Electronic Design; http://electronicdesign.com/electromechanical/smart-walker-detects-obstacles; Aug. 20, 2001; 2 pages.
Frizera et al.; "*The Smart Walkers as Geriatric Assistive Device. The SIMBIOSIS Purpose*"; Gerontechnology, vol. 7, No. 2; Jan. 30, 2008; 6 pages.
Garaj et al.; "*A System for Remote Sighted Guidance of Visually Impaired Pedestrians*"; The British Journal of Visual Impairment; vol. 21, No. 2, 2003; 9 pages.
Ghiani, et al.; "*Vibrotactile Feedback to Aid Blind Users of Mobile Guides*"; Journal of Visual Languages and Computing 20; 2009; 13 pages.
Glover et al.; "*A Robotically-Augmented Walker for Older Adults*"; Carnegie Mellon University, School of Computer Science; Aug. 1, 2003; 13 pages.
Graf, Christian; "*Verbally Annotated Tactile Maps—Challenges and Approaches*"; Spatial Cognition VII, vol. 6222; Aug. 15-19, 2010; 16 pages.
Graft, Birgit; "*An Adaptive Guidance System for Robotic Walking Aids*"; Journal of Computing and Information Technology—CIT 17; 2009; 12 pages.
Greenberg et al.; "*Finding Your Way: A Curriculum for Teaching and Using the Braillenote with Sendero GPS 2011*"; California School for the Blind; 2011; 190 pages.
Guerrero et al.; "*An Indoor Navigation System for the Visually Impaired*"; Sensors vol. 12, Issue 6; Jun. 13, 2012; 23 pages.
Guy et al; "*CrossingGuard: Exploring Information Content in Navigation Aids for Visually Impaired Pedestrians*" Proceedings of the SIGCHI Conference on Human Factors in Computing Systems; May 5-10, 2012; 10 pages.
Hamid, Nazatul Naquiah Abd; "*Facilitating Route Learning Using Interactive Audio-Tactile Maps for Blind and Visually Impaired People*"; CHI 2013 Extended Abstracts; Apr. 27, 2013; 6 pages.
Helal et al.; "*Drishti: An Integrated Navigation System for Visually Impaired and Disabled*"; Fifth International Symposium on Wearable Computers; Oct. 8-9, 2001; 8 pages.
Hesch et al.; "*Design and Analysis of a Portable Indoor Localization Aid for the Visually Impaired*"; International Journal of Robotics Research; vol. 29; Issue 11; Sep. 2010; 15 pgs.
Heyes, Tony; "*The Sonic Pathfinder an Electronic Travel Aid for the Vision Impaired*"; http://members.optuszoo.com.au/aheyew40/pa/pf_blerf.html; Dec. 11, 2014; 7 pages.

(56) References Cited

OTHER PUBLICATIONS

Joseph et al.; "*Visual Semantic Parameterization—To Enhance Blind User Perception for Indoor Navigation*"; Multimedia and Expo Workshops (ICMEW), 2013 IEEE International Conference; Jul. 15, 2013; 7 pages.
Kalra et al.; "*A Braille Writing Tutor to Combat Illiteracy in Developing Communities*"; Carnegie Mellon University Research Showcase, Robotics Institute; 2007; 10 pages.
Kammoun et al.; "*Towards a Geographic Information System Facilitating Navigation of Visually Impaired Users*"; Springer Berlin Heidelberg; 2012; 8 pages.
Katz et al; "*NAVIG: Augmented Reality Guidance System for the Visually Impaired*"; Virtual Reality (2012) vol. 16; 2012; 17 pages.
Kayama et al.; "*Outdoor Environment Recognition and Semi-Autonomous Mobile Vehicle for Supporting Mobility of the Elderly and Disabled People*"; National Institute of Information and Communications Technology, vol. 54, No. 3; Aug. 2007; 11 pages.
Kirinic et al.; "*Computers in Education of Children with Intellectual and Related Developmental Disorders*"; International Journal of Emerging Technologies in Learning, vol. 5, 2010, 5 pages.
Krishna et al.; "*A Systematic Requirements Analysis and Development of an Assistive Device to Enhance the Social Interaction of People Who are Blind or Visually Impaired*"; Workshop on Computer Vision Applications for the Visually Impaired; Marseille, France; 2008; 12 pages.
Kumar et al.; "*An Electronic Travel Aid for Navigation of Visually Impaired Persons*"; Communications Systems and Networks (COMSNETS), 2011 Third International Conference; Jan. 2011; 5 pages.
Lee et al.; "*Adaptive Power Control of Obstacle Avoidance System Using Via Motion Context for Visually Impaired Person.*" International Conference on Cloud Computing and Social Networking (ICCCSN), Apr. 26-27, 2012 4 pages.
Lee et al.; "*A Walking Guidance System for the Visually Impaired*"; International Journal of Pattern Recognition and Artificial Intelligence; vol. 22; No. 6; 2008; 16 pages.
Mann et al.; "*Blind Navigation with a Wearable Range Camera and Vibrotactile Helmet*"; 19th ACM International Conference on Multimedia; Nov. 28, 2011; 4 pages.
Mau et al.; "BlindAid: An Electronic Travel Aid for the Blind;" *The Robotics Institute Carnegie Mellon University*; 27 pages; May 2008.
Meijer, Dr. Peter B.L.; "*Mobile OCR, Face and Object Recognition for the Blind*"; The vOICe, www.seeingwithsound.corn/ocr.htm; Apr. 18, 2014; 7 pages.
Merino-Garcia, et al.; "*A Head-Mounted Device for Recognizing Text in Natural Sciences*"; CBDAR'11 Proceedings of the 4th International Conference on Camera-Based Document Analysis and Recognition; Sep. 22, 2011; 7 pages.
Merri et al.; "*The Instruments for a Blind Teacher of English: The challenge of the board*"; European Journal of Psychology of Education, vol. 20, No. 4 (Dec. 2005), 15 pages.
Newegg; Motorola Behind the Neck Stereo Bluetooth Headphone Black/Red Bulk (S9)—OEM; http://www.newegg.com/Product/Product.aspx?Item=N82E16875982212&Tpk=n82e16875982212 3 pages.
Newegg; Motorola S10-HD Bluetooth Stereo Headphone w/ Comfortable Sweat Proof Design; http://www.newegg.com/Product/Product.aspx?Item=9SIA0NW2G39901&Tpk=9sia0nw2g39901; 4 pages.
Nordin et al.; "*Indoor Navigation and Localization for Visually Impaired People Using Weighted Topological Map*"; Journal of Computer Science vol. 5, Issue 11; 2009; 7 pages.
OMRON; Optical Character Recognition Sensor User's Manual; 2012; 450 pages.
OrCam; www.orcam.com; Jul. 22, 2014; 3 pages.
Pagliarini et al.; "*Robotic Art for Wearable*"; Proceedings of EUROSIAM: European Conference for the Applied Mathematics and Informatics 2010; 10 pages.
Paladugu et al.; "*GoingEasy® with Crowdsourcing in the Web 2.0 World for Visually Impaired Users: Design and User Study*"; Arizona State University; 8 pages.
Park, Sungwoo; "*Voice Stick*"; www.yankodesign.com/2008/08/21/voice-stick; Aug. 21, 2008; 4 pages.
Parkes, Don; "*Audio Tactile Systems for Designing and Learning Complex Environments as a Vision Impaired Person: Static and Dynamic Spatial Information Access*"; EdTech-94 Proceedings; 1994; 8 pages.
Pawar et al.; "*Multitasking Stick for Indicating Safe Path to Visually Disable People*"; IOSR Journal of Electronics and Communication Engineering (IOSR-JECE), vol. 10, Issue 3, Ver. II; May-Jun. 2015; 5 pages.
Pawar et al.; "Review Paper on Multitasking Stick for Guiding Safe Path for Visually Disable People;" *IJPRET*; vol. 3, No. 9; pp. 929-936; 2015.
Ram et al.; "The People Sensor: A Mobility Aid for the Visually Impaired;" 2012 16th International Symposium on Wearable Computers; pp. 166-167; 2012.
Ramya, et al.; "*Voice Assisted Embedded Navigation System for the Visually Impaired*"; International Journal of Computer Applications; vol. 64, No. 13, Feb. 2013; 7 pages.
Ran et al.; "*Drishti: An Integrated Indoor/Outdoor Blind Navigation System and Service*"; Proceeding PERCOM '04 Proceedings of the Second IEEE International Conference on Pervasive Computing and Communications (PerCom'04); 2004; 9 pages.
Rentschler et al.; "*Intelligent Walkers for the Elderly: Performance and Safety Testing of VA-PAMAID Robotic Walker*"; Department of Veterans Affairs Journal of Rehabilitation Research and Development; vol. 40, No. 5; Sep./Oct. 2013; 9pages.
Rodríguez et al.; "*Assisting the Visually Impaired: Obstacle Detection and Warning System by Acoustic Feedback*"; Sensors 2012; vol. 12; 21 pages.
Rodriguez et al; "*CrowdSight: Rapidly Prototyping Intelligent Visual Processing Apps*"; AAAI Human Computation Workshop (HCOMP); 2011; 6 pages.
Rodriquez-Losada et al.; "*Guido, The Robotic Smart Walker for the Frail Visually Impaired*"; IEEE International Conference on Robotics and Automation (ICRA); Apr. 18-22, 2005; 15 pages.
Science Daily; "*Intelligent Walker Designed to Assist the Elderly and People Undergoing Medical Rehabilitation*"; http://www.sciencedaily.com/releases/2008/11/081107072015.htm; Jul. 22, 2014; 4 pages.
Shoval et al.; "*Navbelt and the Guidecane—Robotics-Based Obstacle-Avoidance Systems for the Blind and Visually Impaired*"; IEEE Robotics & Automation Magazine, vol. 10, Issue 1; Mar. 2003; 12 pages.
Shoval et al.; "*The Navbelt—A Computerized Travel Aid for the Blind*"; RESNA Conference, Jun. 12-17, 1993; 6 pages.
Singhal; "The Development of an Intelligent Aid for Blind and Old People;" *Emerging Trends and Applications in Computer Science (ICETACS)*, 2013 1st International Conference; pp. 182-185; Sep. 13, 2013.
Sudol et al.; "*LookTel—A Comprehensive Platform for Computer-Aided Visual Assistance*"; Computer Vision and Pattern Recognition Workshops (CVPRW), 2010 IEEE Computer Society Conference; Jun. 13-18, 2010; 8 pages.
The Nex Band; http://www.mightycast.com/#faq; May 19, 2015; 4 pages.
Treuillet; "*Outdoor/Indoor Vision-Based Localization for Blind Pedestrian Navigation Assistance*"; WSPC/Instruction File; May 23, 2010; 16 pages.
Trinh et al.; "*Phoneme-based Predictive Text Entry Interface*"; Proceedings of the 16th International ACM SIGACCESS Conference on Computers & Accessibility; Oct. 2014; 2 pgs.
Wang, et al.; "*Camera-Based Signage Detection and Recognition for Blind Persons*"; 13th International Conference (ICCHP) Part 2 Proceedings; Jul. 11-13, 2012; 9 pages.
Ward et al.; "*Visual Experiences in the Blind Induced by an Auditory Sensory Substitution Device*"; Journal of Consciousness and Cognition; Oct. 2009; 30 pages.

(56) References Cited

OTHER PUBLICATIONS

Wilson, Jeff, et al. "*Swan: System for Wearable Audio Navigation*"; 11th IEEE International Symposium on Wearable Computers; Oct. 11-13, 2007; 8 pages.

Yabu et al.; "Development of a Wearable Haptic Tactile Interface as an Aid for the Hearing and/or Visually Impaired;" *NTUT Education of Disabilities*; vol. 13; pp. 5-12; 2015.

Yang, et al.; "*Towards Automatic Sign Translation*"; The Interactive Systems Lab, Carnegie Mellon University; 2001; 5 pages.

Yi, Chucai; "Assistive Text Reading from Complex Background for Blind Persons"; CBDAR'11 Proceedings of the 4$^{th}$ International Conference on Camera-Based Document Analysis and Recognition; Sep. 22, 2011; 7 pages.

Zeng et al.; "*Audio-Haptic Browser for a Geographical Information System*"; ICCHP 2010, Part II, LNCS 6180; Jul. 14-16, 2010; 8 pages.

Zhang et al.; "*A Multiple Sensor-Based Shoe-Mounted User Interface Designed for Navigation Systems for the Visually Impaired*"; 5$^{th}$ Annual ICST Wireless Internet Conference (WICON); Mar. 1-3, 2010; 9 pages.

Shidujaman et al.; "Design and navigation Prospective for Wireless Power Transmission Robot;" IEEE; Jun. 2015.

Wu et al. "Fusing Multi-Modal Features for Gesture Recognition", Proceedings of the 15$^{th}$ ACM on International Conference on Multimodal Interaction, Dec. 9, 2013, ACM, pp. 453-459.

Pitsikalis et al. "Multimodal Gesture Recognition via Multiple Hypotheses Rescoring", Journal of Machine Learning Research, Feb. 2015, pp. 255-284.

Shen et al. "Walkie-Markie: Indoor Pathway Mapping Made Easy" 10$^{th}$ USENIX Symposium on Networked Systems Design and Implementation (NSDI'13); pp. 85-98, 2013.

Tu et al. "Crowdsourced Routing II D2.6" 34 pages; 2012.

De Choudhury et al. "Automatic Construction of Travel Itineraries Using Social Breadcrumbs" pp. 35-44; Jun. 2010.

Zhang, Shanjun; Yoshino, Kazuyoshi; A Braille Recognition System by the Mobile Phone with Embedded Camera; 2007; IEEE.

Diallo, Amadou; Sep. 18, 2014; Apple iOS8: Top New Features, Forbes Magazine.

N. Kalar, T. Lawers, D. Dewey, T. Stepleton, M.B. Dias; Iterative Design of a Braille Writing Tutor to Combat Illiteracy; Aug. 30, 2007; IEEE.

\* cited by examiner

SYSTEM AND METHOD FOR WEARABLE SMART DEVICE COMMUNICATIONS

BACKGROUND

1. Field

The present disclosure relates to systems and methods for providing communications between a wearable smart device and a remote device.

2. Description of the Related Art

As computing power becomes faster and electronic devices become smaller, technology is being implemented in increasingly smaller packages. Technology is now at a point in which advanced computing functions can be implemented in devices sufficiently small to be comfortably worn by users as accessories. Wearable computing devices provide the benefit of providing computing functions to a user without being concerned with the volume or the mass of the device while he or she is moving.

The reduction in size of computing equipment is also allowing for an ever-growing internet of things. More and more devices are beginning to include computing functions, and devices that already include some computing functions are being designed to include more and more functionality. For instance, vehicles are now being designed with the ability to drive themselves without human intervention. Vehicles are also being designed to include receivers and transmitters for vehicle-to-vehicle communications.

Thus, there is a need for systems and methods for providing connectivity between wearable smart devices and the internet of things.

SUMMARY

What is described is a wearable smart device for communicating with a remote device, such as a vehicle, a robot or another smart device. The wearable smart device includes an outer casing defining at least one cavity and having a neck portion designed to contact a neck of a user. The wearable smart device also includes a first end portion designed to rest on a first shoulder of the user and a second end portion designed to rest on a second shoulder of the user such that the wearable smart device may be worn by the user. The wearable smart device also includes a wireless communication port at least partially positioned within the at least one cavity and that is designed to communicate with the remote device. The wireless communication port includes at least one of a dedicated short range communication (DSRC) port, a near field communication (NFC) port, an infrared communication port or an ultrasound communication port. The wearable smart device also includes a processor positioned within the at least one cavity, coupled to the wireless communication port and designed to transmit one or more signals to the remote device and/or receive one or more signals from the remote device via the wireless communication port.

Also described is a wearable smart device for communicating with a remote device. The wearable smart device includes a first wireless communication port designed to receive a first signal from the remote device via a first communication protocol. The wearable smart device also includes a second wireless communication port designed to transmit a second signal to the remote device via a second communication protocol that is different than the first communication protocol. The wearable smart device also includes a processor coupled to the first wireless communication port and to the second wireless communication port. The processor is designed to receive the first signal via the first wireless communication port and to transmit the second signal via the second wireless communication port in response to receiving the first signal.

Also described is a wearable smart device for providing collision avoidance instructions to a user at least partially based on wireless communications. The wearable smart device includes a wireless communication port designed to receive a signal from a remote device. The wearable smart device also includes a processor coupled to the wireless communication port. The processor is designed to determine a location of the remote device relative to the wearable smart device based on the received signal and to determine navigation instructions to avoid a collision with the remote device based on the determined location of the remote device. The wearable smart device also includes an output device designed to output the navigation instructions.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Disclosed herein are systems and methods for providing communications between a wearable smart device and a remote device, such as a vehicle, a robot, another wearable smart device, a smartphone, or the like. The systems and methods provide several benefits and advantages such as allowing the wearable smart device to communicate with remote devices via one or more communication protocols. This provides benefits and advantages such as allowing the wearable smart device to communicate with remote devices having different communication capabilities, further providing the benefit and advantage of allowing the wearable smart device to interact with and/or control a variety of devices within a user's environment. For example, the wearable smart device can communicate with a vehicle to determine the location of the vehicle using one type of communication, may transmit and receive audio messages from another wearable smart device using another type of communication, and can determine a location of a storefront using yet another type of communication. The systems and methods provide additional benefits and advantages such as optimizing communications to preserve battery life and to provide relatively high bandwidth. The systems and methods provide additional benefits and advantages such as the ability to receive messages corresponding to a location, a heading, a velocity or an acceleration of a remote device and to provide instructions to a user for avoiding a potential collision with the remote device.

An exemplary system includes one or more wireless communication ports for communicating via one or more communication protocols. The protocols may include, for example, dedicated short-range communication (DSRC), Wi-Fi protocols, Bluetooth protocols, near field communications (NFC) protocols, infrared protocols and/or ultrasound protocols. The system may also include a processor. The processor may communicate with one or more remote devices via the one or more wireless communication ports. The processor may also manage communications over two or more wireless communication ports to optimize the bandwidth of the communications and to preserve the battery power of the wearable smart device. The processor may also determine a location, a heading, a velocity or an acceleration of a remote device based on data received from the remote device via the one or more wireless communication ports. Based on the location, heading, velocity and/or acceleration of the remote device, the processor may determine navigation instructions for avoiding a collision with the remote device. The system may also include an output device for outputting the navigation instructions to the user and/or to output communications received from the remote device.

Figure 1:
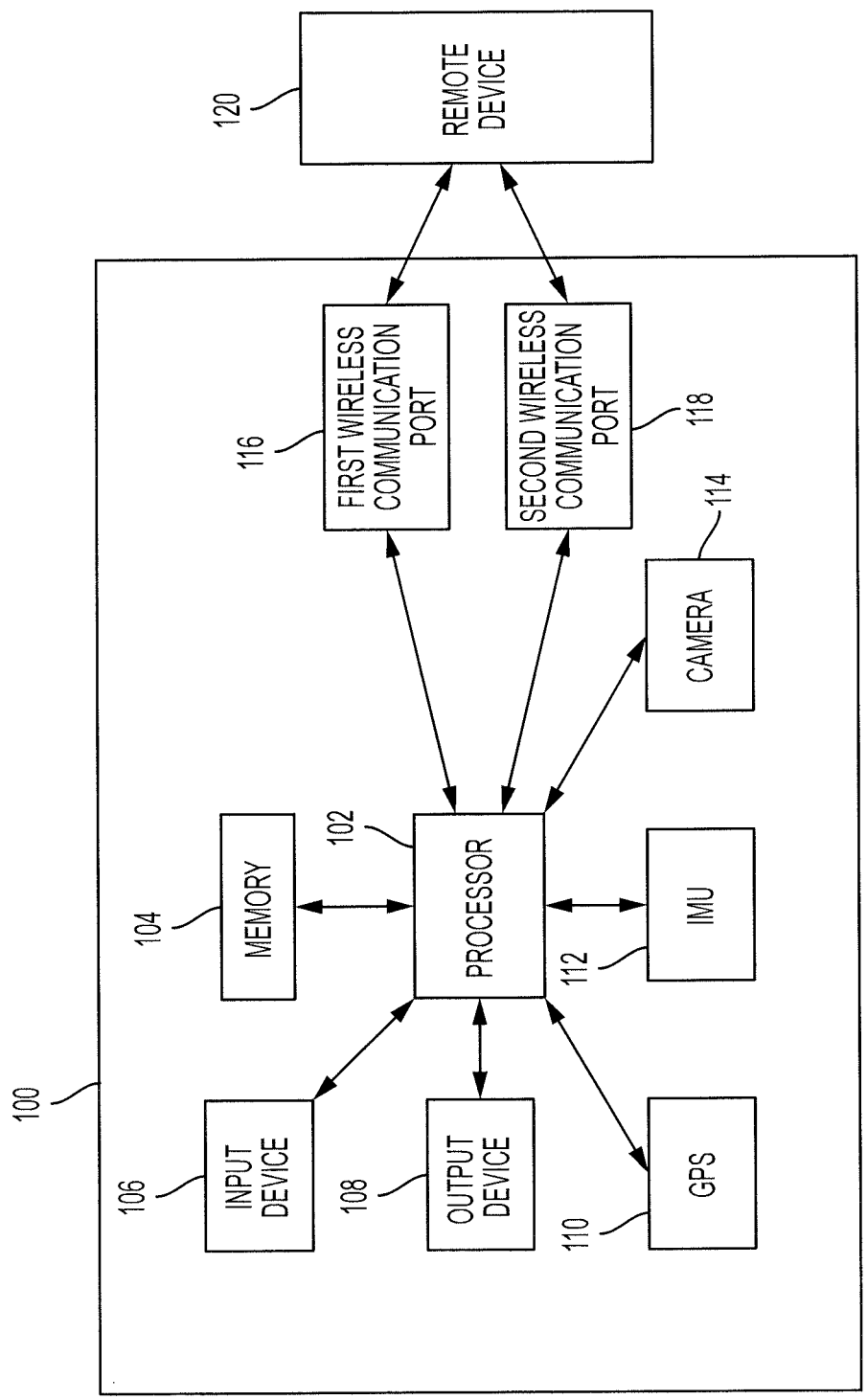
FIG. 1 is a block diagram illustrating features of a wearable smart device for communicating with one or more remote devices according to an embodiment of the present invention.

Referring to FIG. 1, a wearable smart device 100 according to some embodiments may include a processor 102, a memory 104, an input device 106 and an output device 108. The wearable smart device 100 may also include a GPS sensor 110, an IMU 112, a camera 114, a first wireless communication port 116 and a second wireless communication port 118.

The processor 102 may be a computer processor such as an ARM processor, DSP processor, distributed processor or other form of processing. The processor 102 may be positioned on the wearable smart device 100, may be a remote processor or it may be a pairing of a local and a remote processor.

The memory 104 may be one or any combination of the following: a RAM or other volatile or nonvolatile memory, a non-transitory memory or a data storage device, such as a hard disk drive, a solid state disk drive, a hybrid disk drive or other appropriate data storage. The memory 104 may further store machine-readable instructions which may be loaded into the memory 104 and executed by the processor 102. As with the processor 102, the memory 104 may be positioned on the wearable smart device 100, may be remote from the wearable smart device 100 or may be a pairing of a local and a remote memory.

The input device 106 may include any input device such as a touch screen, a plurality of buttons, a microphone or the like. The input device 106 is designed to receive input from a user and/or from an environment of the user.

The output device 108 may include any output device such as a display, one or more speakers, one or more vibration units or the like. The output device 108 is designed to provide output to a user and/or an environment of the user.

The GPS sensor 110 may include one or more GPS receivers designed to detect location data. In that regard, the GPS sensor 110 may be coupled to the processor 102. The processor 102 may be capable of determining a location of the wearable smart device 100 based on the location data detected by the GPS sensor 110.

The IMU 112 may include one or more of an accelerometer, a gyroscope, a magnetometer or the like. The IMU 112 may detect inertial measurement data corresponding to movement of the wearable smart device 100. For example, the inertial measurement data may include an orientation of the wearable smart device 100, an acceleration of the wearable smart device 100, a velocity of the wearable smart device 100, or the like.

The camera 114 may include one or more cameras or other image sensors capable of detecting image data corresponding to an environment of the wearable smart device 100.

The first wireless communication port 116 and the second wireless communication port 118 may include any communication port capable of transmitting and/or receiving data from a remote device 120. A communication port can include at least one of a receiver, a transmitter or a combined receiver and transmitter for receiving and/or transmitting messages using a particular communication protocol. For example, at least one of the first wireless communication port 116 or the second wireless communication port 118 may be capable of transmitting and/or receiving data via a DSRC protocol, a Wi-Fi protocol, a Bluetooth protocol, a NFC protocol, an infrared light protocol or an ultrasound protocol.

DSRC technology may be used by the processor 102 to transmit location information corresponding to a location of the wearable smart device 100 to the remote device 120. DSRC technology may also be used by the processor 102 to receive location information corresponding to a location of the remote device 120. The location information may include a location within a predetermined area, a location relative to another device, an orientation, a velocity, a rate of acceleration or the like. As an example, the remote device 120 may include a transmitter at a storefront capable of transmitting DSRC information providing the name and location of the corresponding store. The user may wish to enter the store and may provide input to the wearable smart device 100 indicating so. The wearable smart device 100 may receive the DSRC signal from the remote device 120, may determine the location of the store relative to the wearable smart device, and may provide navigation instructions to the user directing the user to the storefront.

This function may be useful in situations in which multiple devices are located within a certain area, such as a factory. For example, a moving vehicle or robot may also include a DSRC port that is designed to receive and transmit location information. A vehicle may receive location information corresponding to the wearable smart device 100 and may initiate obstacle avoidance functions to avoid a collision with the user of the wearable smart device 100. Similarly, the wearable smart device 100 may receive location information corresponding to the remote device 120. If the user of the wearable smart device 100 is walking towards the location of the remote device 120, the wearable smart device 100 may provide collision avoidance instructions to the user for avoiding a collision with the remote device 120.

The DSRC communication port may be designed to transmit messages to and/or receive messages from all devices detectable by the wearable smart device 100. In some embodiments, the processor 102 may control the DSRC communication port to only communicate with devices within a predetermined area of the wearable smart device 100.

Wi-Fi technology may be used by the processor 102 for similar functions as DSRC technology. For example, the processor 102 may transmit and/or receive location information, orientation, velocity or the like via the first wireless communication port 116 and/or the second wireless communication port 118 using Wi-Fi protocols. Wi-Fi technology may also be used by the processor 102 for other navigation functions, for alerting other devices of the presence of the wearable smart device 100, for receiving alerts identifying the presence of other devices, or the like.

Wi-Fi technology may also be used for transmitting and/or receiving text, sound or images from nearby device or people and/or from other devices or people via the Internet. For example, the messages may be informational, such as informing the wearable smart device 100 of the identity of an oncoming bus (such as "bus 57 is approaching," "there is a sale at the Gap," "a customer has entered the shop," "a warehouse shelf is empty," "it's raining outside," or the like. The messages may also be social in nature, such as uploading a photograph or audio to a website, transmitting a photograph or audio to a smart device of a friend or the like.

In some embodiments, the messages may include diagnostic or prognostic information regarding the device. For example, this information may include a battery health, an operating temperature, typical usage patterns, typical locations, or the like to nearby devices. The nearby device may alert the user or an administrator of the issue, may record the issue or may initiate a function to repair the issue.

In some embodiments, the messages may also or instead include data or routines for upgrading or enhancing the functionality of the processor 102. For example, the messages may include data for identification of new objects or logos, new apps, firmware upgrades or the like.

In some embodiments, the Wi-Fi communication port may communicate with all devices within a predetermined area of the wearable smart device 100. In some embodiments, the Wi-Fi communication port may only communicate with devices that the processor 102 has been previously paired with or programmed to communicate with. For example, a user of the wearable smart device 100 may indicate that a certain device belongs to a friend of the user. The wearable smart device 100 may then communicate with the friend's device.

Bluetooth technology may be used by the processor 102 for similar functions as Wi-Fi technology. For example, Bluetooth technology may be used to transmit and/or receive location information, orientation, velocity or the like. Bluetooth technology may also be used by the processor for transmitting or receiving data of others smart devices such as headphones, mobile phones, other wearable smart devices, activity trackers, heart rate monitors or the like.

For example, the processor 102 may be coupled to headphones via a Bluetooth port. The headphones may be worn by the user in which case the audio to be played by the headphones may be provided by the processor 102 via the Bluetooth port. In some embodiments, the headphones may be worn by another individual. In this case, the processor 102 may transmit an audio message to the other user's headphones via the Bluetooth port.

When the processor 102 is paired to another smart device via a Bluetooth port, the other smart device may function as another interface for the wearable smart device 100. Non-limiting examples of other smart devices include a smart watch, a smartphone, a tablet, a laptop computer, a personal computer, or the like. In that regard, a user may interact with the processor 102 via the other smart device. For example, the user may make a gesture detectable by the other smart device, push a button on the other smart device, touch a portion of a screen on the other smart device or the like to control functionality of the processor 102. In some embodiments, the other smart device may provide information to the processor 102 via the Bluetooth port. For example, appointment reminders, weather updates, bus schedules or the like may be provided to the processor 102 from the other smart devices via the Bluetooth port. The user may also exchange contact information with another individual via the Bluetooth port.

NFC technology may be used by the processor 102 to transmit and/or receive location information corresponding to the remote device 120. NFC technology may also be used by the processor 102 for controlling the remote device 120. For example, the processor 102 may control an NFC communication port to control a radio, a television, a robot, a lock on a door or the like. The processor 102 may also transmit and/or receive other messages from the remote device 120 via the NFC communication port.

Providing an NFC communication port on the wearable smart device 100 provides advantages. Currently, most NFC transmitters do not utilize battery power. Thus, these transmitters may be implemented in clothing, product packaging or the like. By allowing the wearable smart device 100 to receive NFC messages, the wearable smart device 100 may communicate with a multitude of devices that include a simple NFC transmitter.

Infrared technology may be used by the processor 102 to transmit and/or receive location information corresponding to the remote device 120. Infrared technology may also be used by the processor 102 for controlling the remote device 120 in a similar manner as NFC technology. The processor 102 may also transmit and/or receive other messages from the remote device 120 via the infrared communication port.

Ultrasound technology may be used by the processor 102 to transmit and/or receive location information corresponding to the remote device 120. Ultrasound technology may also be used by the processor 102 for transmitting an audio message to the remote device 120. For example, a user may provide speech input to the wearable smart device 100 via the input device 106. The processor 102 may convert the speech input to an ultrasound signal and transmit the ultrasound signal to the remote device 120 via an ultrasound communication port. The remote device 120 may receive the ultrasound signal and a processor of the remote device 120 may convert the ultrasound signal to an audible signal corresponding to the speech input. In this regard, only the remote device 120 will receive the speech input as opposed to a situation in which the speech input is output via speakers. In some embodiments, the processor 102 may also transmit and/or receive messages from the remote device 120 via the ultrasound port.

In some embodiments, either of the wireless communication ports 116, 118 may also include a display and/or speakers. The processor can relay information to a user or another device via the display and/or speakers. For example, the processor may provide data to a user via one or more lights such as by controlling the color of the light, the intensity of the light or the like. Similarly, the processor may control the light to flash to alert others that the user is distressed or is nearby. This may be particularly useful in low visibility conditions, such as in a fire. The processor may control the speakers to provide similar information. For example, the speakers may output a beeping sound to alert others that the user is distressed or nearby.

Figure 2:
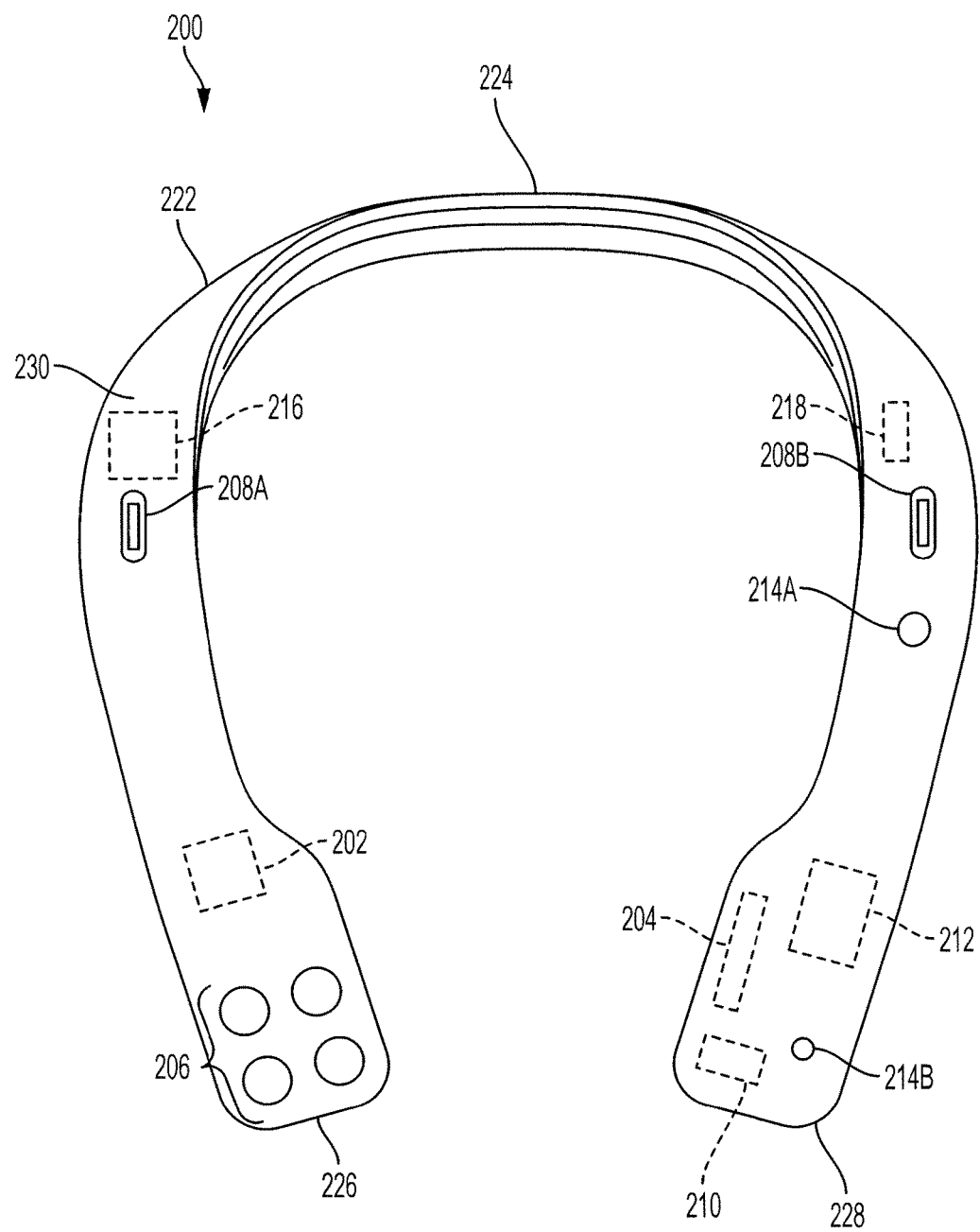
FIG. 2 is a drawing of a wearable smart device designed to be worn around a user's neck and having features for communicating with one or more remote devices according to an embodiment of the present invention.

Turning now to FIG. 2, a wearable smart device 200 is shown. The wearable smart device 200 includes a processor 202 and a memory 204. The processor 202 and the memory 204 function in a similar manner as the processor 102 and the memory 104 of FIG. 1.

The wearable smart device 200 also includes buttons 206. The buttons 206 may be used by a user to control operation of the wearable smart device 200. In that regard, the buttons 206 correspond to an input device.

The wearable smart device 200 also includes a first output unit 208A and a second output unit 208B. Each of the output units 208A, 208B include a speaker and a vibration unit. In that regard, the wearable smart device 200 may provide stereo audio output and/or stereo haptic output via the output units 208A, 208B.

The wearable smart device 200 also includes a GPS sensor 210 and an IMU 212 that function in a similar manner as the GPS sensor 110 and IMU 112 of FIG. 1.

The wearable smart device 200 includes a stereo camera pair 214 including a first camera 214A and a second camera 214B. The stereo camera pair 214 may provide stereo image data to the processor 202. The processor 202 may determine distance information corresponding to objects in the environment of the wearable smart device 200 based on the stereo image data.

The wearable smart device 200 includes a first wireless communication port 216 and a second wireless communication port 218. The wireless communication ports 216, 218 function in a similar manner as the wireless communication ports 116, 118 of FIG. 1.

The wearable smart device 200 includes an outer casing 222 that resembles a necklace. The outer casing 222 includes a neck portion 224, a first end portion 226 and a second end portion 228. When worn, the neck portion 224 may rest against the back of the user's neck and/or shoulders. The first end portion 226 extends across one of the user's shoulders and may rest against the front of the user's shoulder and/or the user's chest. Similarly, the second end portion 228 extends across the user's other shoulder and may rest against the front of the user's other shoulder and/or the other side of the user's chest.

The outer casing 222 defines one or more cavities 230. One or more of the components of the wearable smart device 200 may be at least partially positioned within the one or more cavities 230. For example, a single cavity may be defined within the outer casing 222 such that each component is positioned within the same cavity. Alternatively, the outer casing 222 may define multiple cavities such that one or more components are positioned within each cavity.

Some components may only be partially positioned within a cavity. For example, the output units 208A, 208B may each have a portion that is positioned within the cavity and may also have a portion that is flush with or extends beyond the outer casing 222.

The wearable smart device 200 and/or the wearable smart device 100 of FIG. 1 may be designed to optimize communications by increasing battery life and communication bandwidth. For example, the first wireless communication port 216 may include an NFC communication port and the second wireless communication port 218 may include a Bluetooth port. The NFC communication port may utilize less battery power than the Bluetooth port and may provide a smaller bandwidth than the Bluetooth port.

Figure 3:
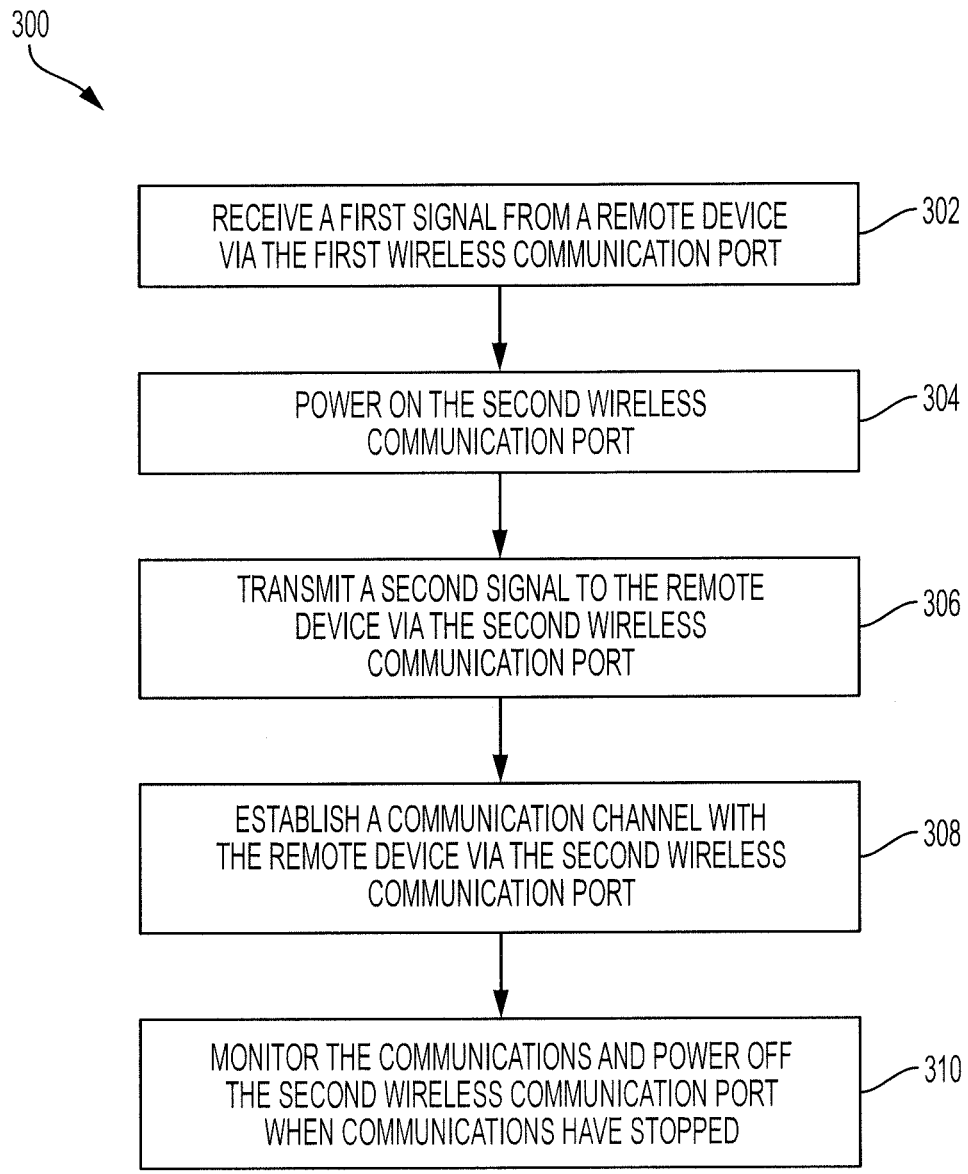
FIG. 3 is a flowchart illustrating a method to be performed by a processor of a wearable smart device for optimizing bandwidth and battery power during communications with a remote device according to an embodiment of the present invention.

Turning now to FIG. 3, a method 300 for optimizing communications by increasing battery power and bandwidth by a wearable smart device is shown. The method 300 may be performed by a processor of a wearable smart device, such as the processor 102 of FIG. 1. The wearable smart device may have two wireless communication ports. In some embodiments, the first wireless communication port may utilize less power to remain in an on state than the second wireless communication port, and in some embodiments, the second wireless communication port may provide for higher bandwidth communications than the first wireless communication port. In some embodiments, the first wireless communication port may include a DSRC port, a Wi-Fi port, a Bluetooth port, an NFC port, an infrared communication port or an ultrasound communication port. In some embodiments, the second wireless communication port may include a DSRC port, an infrared communication port, an ultrasound communication port, a Bluetooth port or a Wi-Fi port.

In some embodiments, the first wireless communication port may always remain in an on state when the wearable smart device is being worn by the user. The second wireless communication port may remain in an off state until instructed otherwise by the processor.

In block 302, the first wireless communication port may receive a signal from a remote device. The data contained in the signal may be received by the processor of the wearable smart device. For example, the remote device may transmit a signal using an NFC protocol indicating that the remote device wishes to establish communications with the wearable smart device. The signal transmitted by the remote device may also include a list of one or more protocols with which the remote device can communicate. The signal may also include an identifier usable by the wearable smart device to establish communications with the remote device via the one or more protocols. For example, the signal may indicate that the remote device can communicate via Wi-Fi and via Bluetooth. The signal may also include an identifier corresponding to the remote device's Wi-Fi port and another identifier corresponding to the remote device's Bluetooth port.

In response to receiving the signal requesting communications, the processor of the wearable smart device may determine if the wearable smart device is capable of communicating via one or more of the protocols provided by the remote device. If the wearable smart device is capable of communicating with the remote device via more than one of the protocols then the processor may determine the ideal protocol for communication.

The ideal protocol may be determined based on, for example, a remaining battery life of the wearable smart device, the power consumption required to communicate via the protocol, the bandwidth allowable by the protocol, a distance to the remote device, security risks associated with communicating via the protocols, the type of message to be communicated or the like.

For example, the remote device and the wearable smart device may each be capable of communicating via Wi-Fi and Bluetooth and the remote device may be at least 10 meters (32.1 feet) away from the wearable smart device. In this case, the processor may select to communicate with the remote device via Wi-Fi because the Bluetooth signal may become degraded over that distance. As another example, the remote device and the wearable smart device may each be capable of communicating via Wi-Fi and ultrasound and the message to be communicated may be an audio message. In this case, the processor may select to communicate with the remote device via ultrasound as the audio message may be transmitted clearly and the ultrasound communication port may require less power than the Wi-Fi port.

After the first signal requesting communications has been received by the wearable smart device in block 302, the processor of the wearable smart device may power on the second wireless communication port in block 304. Powering on the second wireless communication port may refer to switching the second wireless communication port to an on state such that data may be received and/or transmitted by the second wireless communication port.

After the second wireless communication port has been switched to the on state, the processor may transmit a signal to the remote device via the second wireless communication port in block 306. The signal transmitted from the wearable smart device via the second wireless communication port may be an initialization signal usable by the wearable smart device and/or the remote device to establish a communication channel between the wearable smart device and the remote device. In some embodiments, the signal transmitted from the wearable smart device via the second wireless communication port may include an identifier of the second wireless communication port such that the remote device can transmit messages to the wearable smart device via the second wireless communication port.

After the signal has been sent to the remote device, the processor of the wearable smart device or of the remote device may establish a communication channel between the wearable smart device and the remote device via the second wireless communication port in block 308. In some embodiments, a continuous communication channel is not established and the wearable smart device and the remote device may communicate via single messages or groups of messages without an established continuous communication channel. In that regard, the signal transmitted by the wearable smart device via the second wireless communication port may indicate to the remote device that the second wireless communication port is in an on state. In some embodiments, the second signal may be sent from the first wireless communication port and may include an identifier of the second wireless communication port and an indication that the wearable smart device can now receive messages via the second wireless communication port.

After communications have been established between the wearable smart device and the remote device (or the devices are aware that data may be transferred via the second wireless communication port), the processor of the wearable smart device may monitor the communications to determine when communications have stopped. For example, the remote device may have sent a signal requesting closure of the communication channel. As another example, the processor may be designed to close the communication channel when no messages have been transmitted or received by the second wireless communication port for a predetermined amount of time, such as 30 seconds, one minute, two minutes or the like.

As another example, the processor may determine to close the communication channel in response to a predetermined event such as an input from the user, transmission of all packets of a particular communication, receipt of all packets of a particular communication or the like. When communications have stopped or the processor determines that communications should stop, the processor may close the communication channel and power off the second wireless communication port in block 310.

Because the first wireless communication port has a smaller bandwidth than the second wireless communication port, the method 300 optimizes bandwidth by establishing communications via the second wireless communication port upon request from the remote device. The additional bandwidth provided by the second wireless communication port allows for faster communication between the wearable smart device and the remote device.

Because the second wireless communication port requires more power than the first wireless communication port, the method 300 optimizes power usage by powering off the second wireless communication port when communications with the remote device have ceased. Battery life is further optimized because the second wireless communication port remains in the off state until another communication request is received by the first wireless communication port. Thus, in this way, the processor optimizes bandwidth by providing for communications via the communication port having the higher bandwidth and optimizes power by causing the communication port that requires the most power to be in the off state when communications are not occurring.

A similar method to the method 300 may also be performed by a wearable smart device, such as the wearable smart device 100 of FIG. 1 or the wearable smart device 200 of FIG. 2, for establishing communications with the remote device. For example, instead of receiving a signal from the remote device in block 302, the wearable smart device may transmit a signal to the remote device via the first wireless communication port. The signal may include identification information usable by the remote device to establish communications with a second wireless communication port of the wearable smart device. The wearable smart device may then power on the second wireless communication port and, after a period of time, receive a message from the remote device via the second wireless communication port. A communication channel may then be established between the two devices via the second wireless communication port. When communications have ceased via the second communication port, the processor may power off the second communication port.

Figure 4:
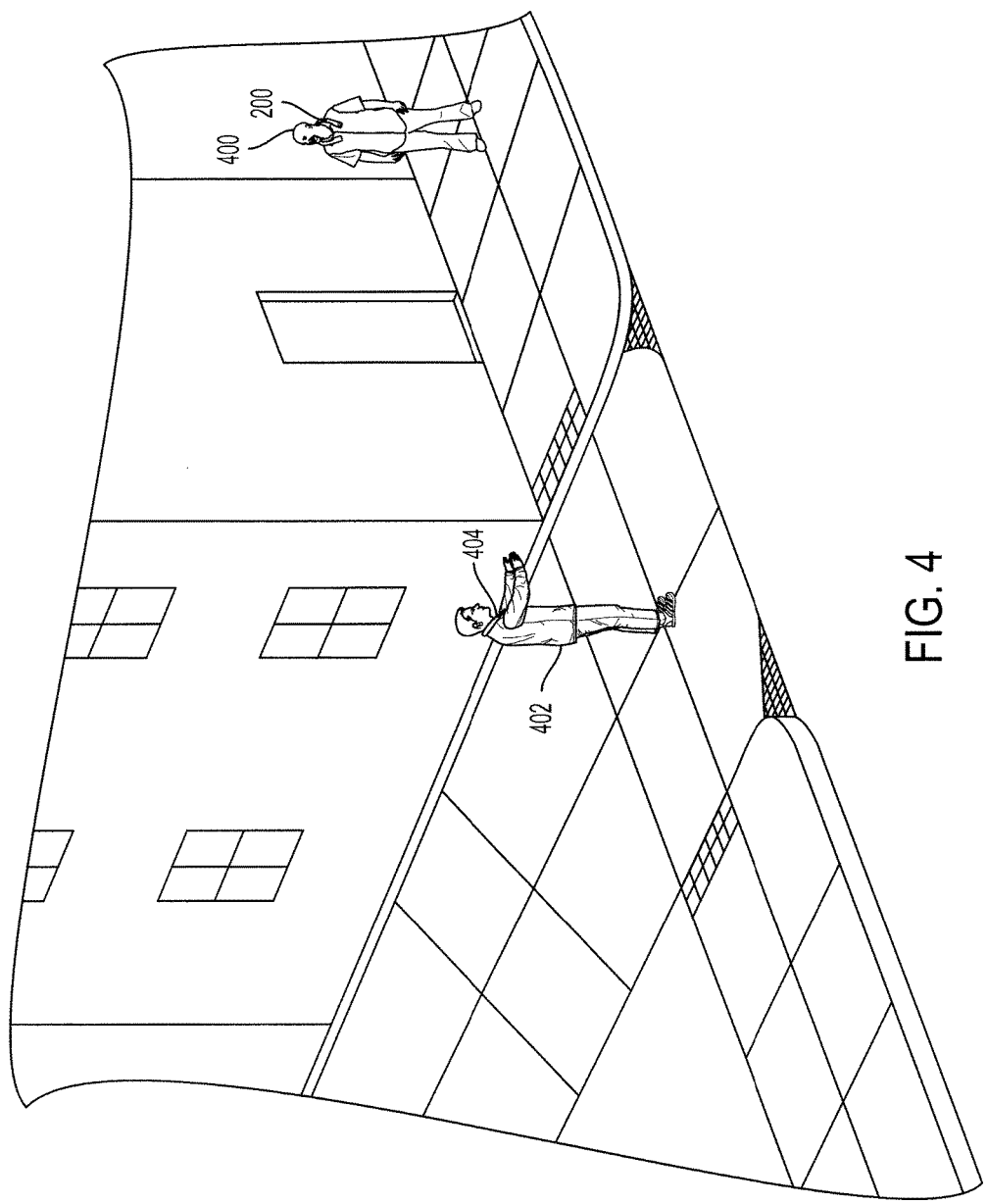
FIG. 4 is a drawing illustrating an exemplary use of the method of FIG. 3 by the wearable smart device of FIG. 2 according to an embodiment of the present invention.

Referring now to FIGS. 2, 3 and 4, and exemplary use of the method 300 by the wearable smart device 200 is shown. A user 400 is wearing the wearable smart device 200. As the user 400 is walking down the street, another user 402 using another wearable smart device 404 may be walking towards the user 400. The other user 402 (or the other wearable smart device 404) may recognize the user 400 and wish to transfer information to the user 400 via the wearable smart devices 404 and 200. In that regard, the wearable smart device 404 may transmit a signal requesting that communications be established between it and the wearable smart device 200. The signal transmitted by the wearable smart device 404 may be transmitted via a first wireless communication port that has a lower bandwidth yet requires less power than a second wireless communication port.

The wearable smart device 200 may receive the signal via the first wireless communication port 216 that has a lower bandwidth and requires less power than the second wireless communication port 218. Upon receiving the signal, the wearable smart device 200 may power on the second wireless communication port 218 and may transmit a signal to the wearable smart device 404 via the second wireless communication port 218. The wearable smart device 200 may establish a communication channel and transmit and receive data via the second wireless communication port 218 that provides for higher bandwidth than the first wireless communication port 216. When communications have stopped, the wearable smart device 200 may power off the second wireless communication port 218 in order to preserve battery power.

Referring back now to FIG. 2, the wearable smart device 200 is also capable of providing navigation instructions to a user. Along with providing navigation instructions, the wearable smart device 200 may also provide collision avoidance instructions to the user to reduce the likelihood of collisions between the user and another device or object.

Figure 5:
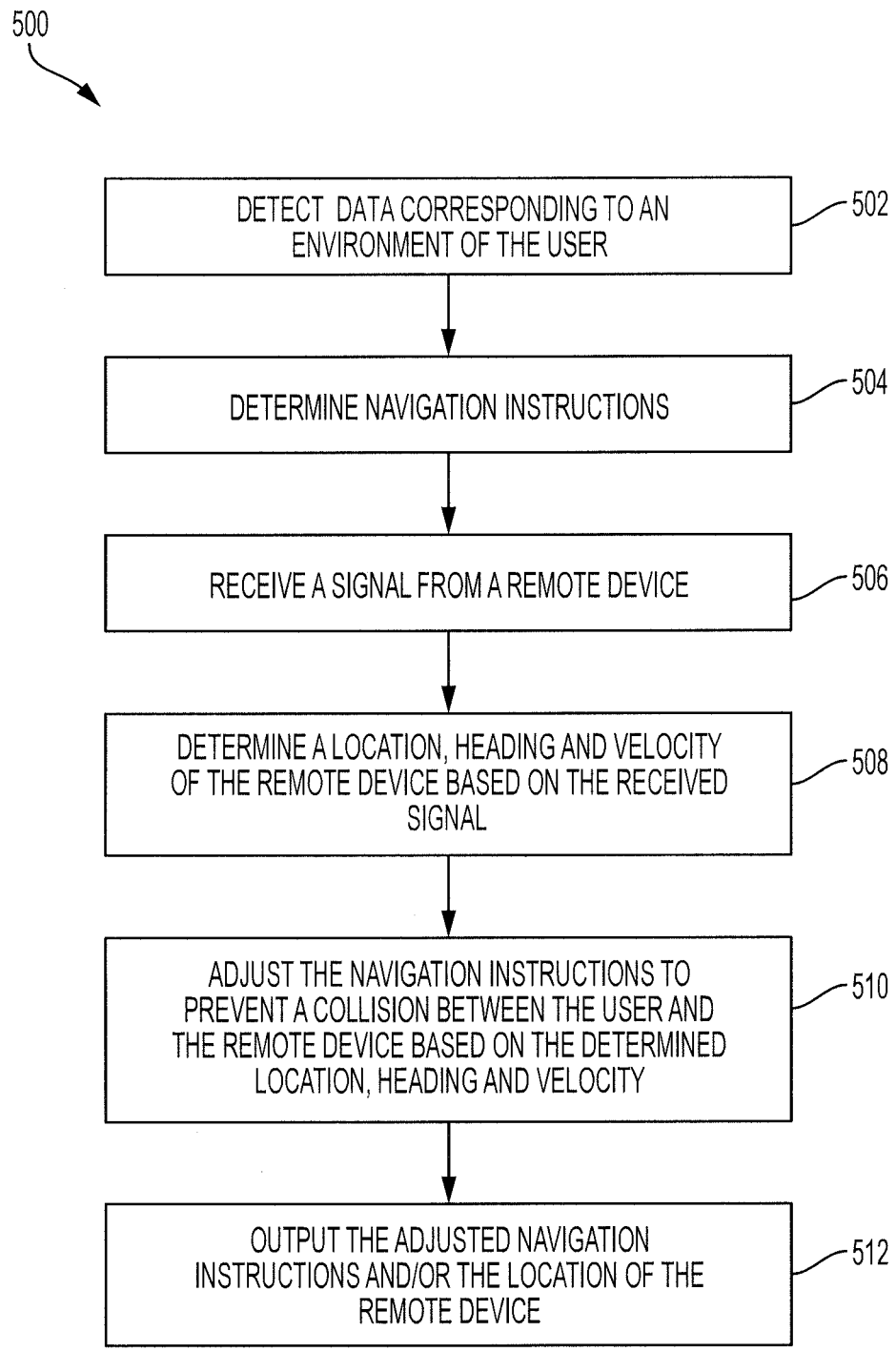
FIG. 5 is a flowchart illustrating a method to be performed by a processor of a wearable smart device for determining and providing collision avoidance instructions based on data received via a wireless communication port of the wearable smart device according to an embodiment of the present invention.

Turning to FIG. 5, a method 500 for providing navigation and/or collision avoidance instructions is shown. The method 500 may be performed by a processor of a wearable smart device such as the processor 102 of the wearable smart device 100 of FIG. 1 or the processor 202 of the wearable smart device 200 of FIG. 2. The method 500 may be used to provide navigation instructions and, in some embodiments, portions of the method 500 may be used to provide collision avoidance instructions.

In block 502, the processor may receive data corresponding to an environment of the wearable smart device, such as inertial measurement data from an IMU, location data from a GPS sensor, image data from a camera, or the like. For example, the processor may receive image data and one or more of inertial measurement data or location data. As another example, the processor may receive only one or more of inertial measurement data or location data. In some embodiments, the location data may be received from a device other than a GPS sensor, such as via Wi-Fi.

Based on the detected data and desired destination, the processor may determine navigation instructions from a current location of the wearable smart device to the desired destination. In some embodiments, the processor may begin providing navigation instructions via the output device. In some embodiments, the processor may not begin determining navigation instructions until the function of block 508 has been performed.

In block 506, the processor may receive a signal from a remote device. The signal may be received via a wireless communication port such as a DSRC port, a Wi-Fi port, a Bluetooth port, an NFC port, an infrared communications port or the like.

The processor may be capable of determining a location, heading and/or velocity of the remote device based on the received signal. In some embodiments, the signal transmitted by the remote device may provide location data corresponding to the location of the remote device. For example, the remote device may include a GPS sensor and the remote device may transmit the location data detected by the GPS sensor via its DSRC communication port.

In some embodiments, the signal may also or instead include inertial measurement data (such as orientation and movement data) that corresponds to orientation and movement of the remote device. For example, the remote device may include a GPS or IMU and the remote device may transmit the data detected by the GPS or the IMU. This data may be usable by the processor of the wearable smart device to determine an orientation and/or velocity of the remote device. For example, the processor may determine the location of the remote device relative to the wearable smart device via image data detected by the camera and may determine the heading, orientation, velocity and/or acceleration of the remote device based on the received orientation and movement data.

In some embodiments, the processor may be capable of determining the location of the remote device relative to the wearable smart device based on a signal intensity, a direction from which the signal was received or the like. For example, the remote device may transmit a signal using an NFC protocol. Based on the strength of the NFC signal and the direction from which the NFC signal was received, the processor may determine the location of the remote device relative to the wearable smart device. In some embodiments, the remote device may transmit multiple signals via the NFC protocol. The processor of the wearable smart device may determine two or more locations of the remote device based on the multiple signals. Based on an elapsed time between the signals and a change in distance between the two locations, the processor may be capable of determining the heading, velocity, acceleration or the like of the remote device.

After the location, heading and/or velocity of the remote device has been determined by the processor, the processor may adjust the navigation instructions to prevent a collision between the user and the remote device based on the determined location, heading and/or velocity of the remote device in block 510. For example, if the user is traveling in a direction towards a stationary remote device, the processor may adjust the navigation instructions to navigate the user around the remote device. As another example, if the user is stationary and the remote device is heading towards the location of the user, the processor may provide instructions to the user to move to a location away from the heading of the remote device. If the user and the remote device are both moving and the processor determines that a collision between the user and the remote device is likely based on the location, heading, velocity and/or acceleration of both, the processor may provide instructions to the user to change his heading, velocity or location to avoid the collision.

In some embodiments, the processor may begin providing navigation instructions after determining the location, heading and/or velocity of all remote devices within the detectable area of the wearable smart device. For example, upon receiving a desired destination, the processor may determine the location of all detectable remote devices and may plan the navigation instructions to avoid a collision with the detectable remote devices.

In some embodiments, the processor may provide the collision avoidance instructions without providing navigation instructions. In that regard, the wearable smart device may continuously receive signals from remote devices indicating their location, heading and velocity. The processor may continue to monitor locations, headings and velocities of the remote devices and may determine instructions to provide to the user for avoiding collisions whenever a collision appears likely.

In block 512, the processor may provide the adjusted navigation instructions, the collision avoidance instructions and/or the relative location of the remote device to the user. In some embodiments, the processor may cause this information to be output via one or more speakers of the wearable smart device. In some embodiments, the processor may provide the adjusted navigation instructions and/or collision avoidance instructions to the user via haptic feedback. For example, the processor may cause a left vibration unit to vibrate to instruct a user to turn to the left and may cause a right vibration unit to vibrate to instruct a user to turn to the right.

Figure 6:
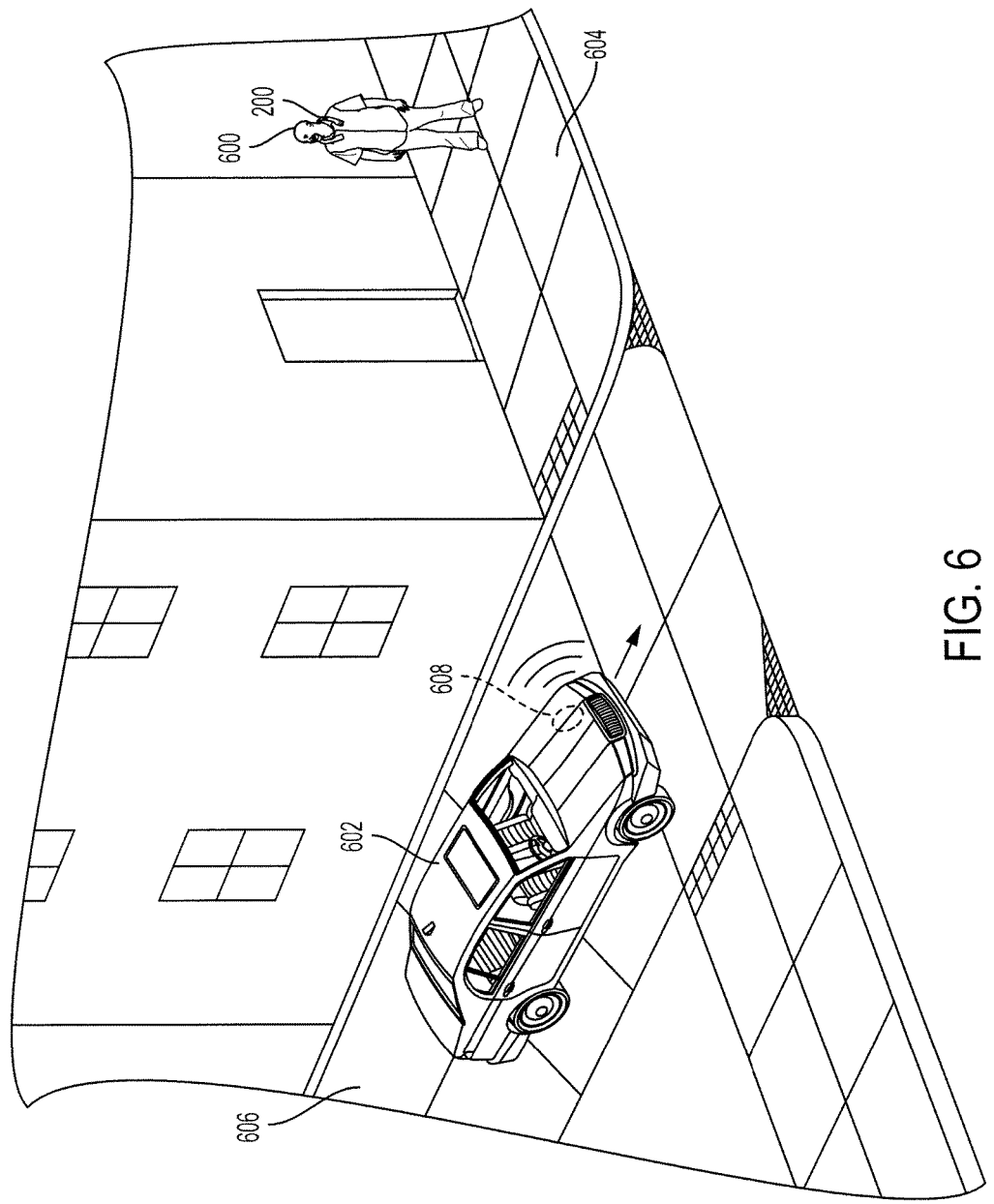
FIG. 6 is a drawing illustrating an exemplary use of the method of FIG. 5 by the wearable smart device of FIG. 2 according to an embodiment of the present invention.

Referring to FIGS. 2, 5 and 6, an exemplary use of the method 500 by the wearable smart device 200 is shown. A user 600 is wearing the wearable smart device 200 and walking along a sidewalk 604. A vehicle 602 is traveling along a road 606 that intersects with the sidewalk 604. The vehicle 602 includes a DSRC port 608 that transmits information corresponding to a location of the vehicle 602.

When the wearable smart device 200 is sufficiently close to the vehicle 602 that the wearable smart device 200 can receive the signals from the DSRC port 608, the wearable smart device 200 may receive and analyze the signals. The processor 202 of the wearable smart device 200 may determine the location, heading and velocity of the vehicle 602 relative to the location of the user 600 based on the received signals.

Based on determined location, heading and velocity of the vehicle 602 as well as current location, heading and velocity of the user 600, the processor 202 may determine that a collision between the vehicle 602 and the user 600 is likely to occur. Based on this determination, the processor 202 may either adjust navigation instructions provided to the user or may provide collision avoidance instructions to the user via one or more of the output units 208A, 208B.

Upon receiving the adjusted navigation instructions or collision avoidance instructions, the user 600 may change his or her heading and/or velocity to avoid the collision. In this way, the data received by the wireless communication port of the wearable smart device 200 may be used to prevent collisions between a user and a remote device.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A wearable electronic device for communicating with a remote device, the wearable electronic device comprising:
    a first wireless communication port configured to receive a first signal from the remote device via a first communication protocol, wherein the first signal indicates a request by the remote device to communicate with the wearable electronic device;
    a second wireless communication port configured to transmit a second signal to the remote device via a second communication protocol that is different than the first communication protocol, wherein the second signal initializes communications with the remote device via the second wireless communication port; and
    a processor coupled to the first wireless communication port and to the second wireless communication port and configured to receive the first signal via the first wireless communication port and to transmit the second signal via the second wireless communication port in response to receiving the first signal.

2. The wearable electronic device of claim 1 wherein the second wireless communication port provides for higher bandwidth communications between the wearable electronic device and the remote device than the first wireless communication port.

3. The wearable electronic device of claim 1 wherein the second wireless communication port requires more power to be in an on state than the first wireless communication port.

4. The wearable electronic device of claim 1 wherein the processor is further configured to switch the second wireless communication port to an on state in response to receiving the first signal.

5. The wearable electronic device of claim 1 wherein the processor is further configured to determine when communications between the wearable electronic device and the remote device via the second wireless communication port have ended and to switch the second wireless communication port to an off state in response to determining that the communications have ended.

6. The wearable electronic device of claim 1 wherein the first wireless communication port includes at least one of a dedicated short range communication (DSRC) port, a Bluetooth port, a near field communications (NFC) port, an infrared communication port or an ultrasound communication port and wherein the second wireless communication port includes at least one of a DSRC port, an infrared communication port, an ultrasound communication port, a Bluetooth port or a Wi-Fi port.

7. The wearable electronic device of claim 1 further comprising an outer casing defining at least one cavity and wherein at least a portion of the first wireless communication port, at least a portion of the second wireless communication port, and the processor are positioned within the at least one cavity and wherein the outer casing has a neck portion configured to be positioned against a neck or back of a user and two end portions configured to extend across shoulders of the user.

8. A wearable electronic device for communicating with a remote device, the wearable electronic device comprising:
    a first wireless communication port configured to receive a first signal from the remote device via a first communication protocol;
    a second wireless communication port configured to transmit a second signal to the remote device via a second communication protocol that is different than the first communication protocol, wherein the second wireless communication port provides for higher bandwidth communications between the wearable electronic device and the remote device than the first wireless communication port; and
    a processor coupled to the first wireless communication port and to the second wireless communication port and configured to receive the first signal via the first wireless communication port and to transmit the second signal via the second wireless communication port in response to receiving the first signal.

9. The wearable electronic device of claim 8 wherein the second wireless communication port requires more power to be in an on state than the first wireless communication port.

10. The wearable electronic device of claim 8 wherein the processor is further configured to switch the second wireless communication port to an on state in response to receiving the first signal.

11. The wearable electronic device of claim 8 wherein the processor is further configured to determine when communications between the wearable electronic device and the remote device via the second wireless communication port have ended and to switch the second wireless communication port to an off state in response to determining that the communications have ended.

12. The wearable electronic device of claim 8 wherein the first wireless communication port includes at least one of a dedicated short range communication (DSRC) port, a Bluetooth port, a near field communications (NFC) port, an infrared communication port or an ultrasound communication port and wherein the second wireless communication port includes at least one of a DSRC port, an infrared communication port, an ultrasound communication port, a Bluetooth port or a Wi-Fi port.

13. The wearable electronic device of claim 8 further comprising an outer casing defining at least one cavity and wherein at least a portion of the first wireless communication port, at least a portion of the second wireless communication port, and the processor are positioned within the at least one cavity and wherein the outer casing has a neck portion configured to be positioned against a neck or back of a user and two end portions configured to extend across shoulders of the user.

14. A wearable electronic device for communicating with a remote device, the wearable electronic device comprising:
   a first wireless communication port configured to receive a first signal from the remote device via a first communication protocol;
   a second wireless communication port configured to transmit a second signal to the remote device via a second communication protocol that is different than the first communication protocol, wherein the second wireless communication port requires more power to be in an on state than the first wireless communication port; and
   a processor coupled to the first wireless communication port and to the second wireless communication port and configured to receive the first signal via the first wireless communication port and to transmit the second signal via the second wireless communication port in response to receiving the first signal.

15. The wearable electronic device of claim 14 wherein the processor is further configured to switch the second wireless communication port to an on state in response to receiving the first signal.

16. The wearable electronic device of claim 14 wherein the processor is further configured to determine when communications between the wearable electronic device and the remote device via the second wireless communication port have ended and to switch the second wireless communication port to an off state in response to determining that the communications have ended.

17. The wearable electronic device of claim 14 wherein the first wireless communication port includes at least one of a dedicated short range communication (DSRC) port, a Bluetooth port, a near field communications (NFC) port, an infrared communication port or an ultrasound communication port and wherein the second wireless communication port includes at least one of a DSRC port, an infrared communication port, an ultrasound communication port, a Bluetooth port or a Wi-Fi port.

18. The wearable electronic device of claim 14 further comprising an outer casing defining at least one cavity and wherein at least a portion of the first wireless communication port, at least a portion of the second wireless communication port, and the processor are positioned within the at least one cavity and wherein the outer casing has a neck portion configured to be positioned against a neck or back of a user and two end portions configured to extend across shoulders of the user.

* * * * *